United States Patent
Akaike et al.

(10) Patent No.: US 8,141,945 B2
(45) Date of Patent: Mar. 27, 2012

(54) VEHICLE SEAT

(75) Inventors: Fumitoshi Akaike, Aichi-ken (JP); Shotaro Tani, Nissin (JP)

(73) Assignees: Toyota Boshoku Kabushiki Kaisha, Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 118 days.

(21) Appl. No.: 12/596,286

(22) PCT Filed: Apr. 4, 2008

(86) PCT No.: PCT/JP2008/056786
§ 371 (c)(1),
(2), (4) Date: Feb. 4, 2010

(87) PCT Pub. No.: WO2008/129935
PCT Pub. Date: Oct. 30, 2008

(65) Prior Publication Data
US 2010/0117410 A1  May 13, 2010

(30) Foreign Application Priority Data
Apr. 20, 2007  (JP) .................. 2007-111679

(51) Int. Cl.
*B60N 2/42*  (2006.01)
*B60N 2/427*  (2006.01)
*B60N 2/48*  (2006.01)
(52) U.S. Cl. .............................. 297/216.12
(58) Field of Classification Search .............. 297/216.12
See application file for complete search history.

(56) References Cited

U.S. PATENT DOCUMENTS

| | | | | |
|---|---|---|---|---|
| 5,205,585 | A | * | 4/1993 | Reuber et al. .................. 280/753 |
| 5,466,001 | A | * | 11/1995 | Gotomyo et al. .... 297/216.12 X |
| 5,580,124 | A | * | 12/1996 | Dellanno ................. 297/216.12 |
| 5,694,320 | A | * | 12/1997 | Breed ................... 297/216.12 X |
| 5,722,722 | A | * | 3/1998 | Massara ................... 297/216.13 |
| 5,769,489 | A | * | 6/1998 | Dellanno ............. 297/216.12 X |
| 5,772,280 | A | * | 6/1998 | Massara ................... 297/216.12 |
| 5,842,738 | A | * | 12/1998 | Knoll et al. .............. 297/216.12 |
| 5,961,182 | A | * | 10/1999 | Dellanno ................. 297/216.12 |
| 5,975,637 | A | * | 11/1999 | Geuss et al. ......... 297/216.12 X |
| 6,017,086 | A | * | 1/2000 | Meyer et al. ............. 297/216.12 |
| 6,079,776 | A | * | 6/2000 | Breitner et al. .......... 297/216.12 |

(Continued)

FOREIGN PATENT DOCUMENTS
EP   1046550   10/2000
(Continued)

OTHER PUBLICATIONS
English language Abstract of JP 2000-335301, Dec. 5, 2000.
(Continued)

*Primary Examiner* — Rodney B White
(74) *Attorney, Agent, or Firm* — Greenblum & Bernstein, P.L.C.

(57) ABSTRACT

A vehicle seat includes a first sensor that is disposed inside a seat back and is capable of detecting a back-side collision of a vehicle when pressed by a body of a sitting passenger, and a second sensor that is capable of detecting the back-side collision of the vehicle based on a longitudinal acceleration of the vehicle. A head rest is constructed to be moved forwardly based on detection signals when both of the sensors detect the back-side collision of the vehicle.

24 Claims, 14 Drawing Sheets

U.S. PATENT DOCUMENTS

| | | | |
|---|---|---|---|
| 6,082,817 A * | 7/2000 | Muller | 297/216.12 |
| 6,149,232 A * | 11/2000 | Meyer | 297/216.12 |
| 6,390,549 B1 * | 5/2002 | Mayer et al. | 297/216.12 X |
| 6,474,733 B1 | 11/2002 | Heilig et al. | |
| 6,478,373 B1 * | 11/2002 | Hake et al. | 297/216.12 X |
| 6,715,829 B2 * | 4/2004 | Svantesson et al. | 297/216.12 |
| 6,761,403 B2 * | 7/2004 | Pal et al. | 297/216.12 |
| 6,802,562 B1 * | 10/2004 | Hake et al. | 297/216.12 |
| 6,820,930 B2 * | 11/2004 | Dellanno | 297/216.12 |
| 6,824,212 B2 * | 11/2004 | Malsch et al. | 297/216.12 |
| 6,863,343 B2 * | 3/2005 | Pal et al. | 297/216.12 |
| 6,890,028 B2 * | 5/2005 | Pal et al. | 297/216.12 |
| 7,017,989 B2 * | 3/2006 | Yamaguchi et al. | 297/216.12 |
| 7,048,334 B2 * | 5/2006 | Pal et al. | 297/216.12 |
| 7,090,292 B2 * | 8/2006 | Dellanno | 297/216.12 |
| 7,108,320 B2 * | 9/2006 | Schafer et al. | 297/216.12 |
| 7,134,717 B2 * | 11/2006 | Thunnissen et al. | 297/216.12 |
| 7,185,950 B2 * | 3/2007 | Pettersson et al. | 297/216.12 |
| 7,293,829 B2 * | 11/2007 | Thiel et al. | 297/216.12 |
| 7,350,859 B2 * | 4/2008 | Klukowski | 297/216.12 |
| 7,445,282 B2 * | 11/2008 | Sakai | 297/216.12 |
| 7,448,678 B2 * | 11/2008 | Browne et al. | 297/216.12 |
| 7,484,796 B2 * | 2/2009 | Fischer et al. | 297/216.12 |
| 7,556,313 B2 * | 7/2009 | Browne et al. | 297/216.12 |
| 7,588,289 B2 * | 9/2009 | Bostrom et al. | 297/216.12 |
| 7,594,697 B2 * | 9/2009 | Browne et al. | 297/216.12 |
| 7,611,196 B2 * | 11/2009 | Terada et al. | 297/216.12 |
| 7,618,091 B2 * | 11/2009 | Akaike et al. | 297/216.12 |
| 7,631,932 B2 * | 12/2009 | Hoffmann | 297/216.12 |
| 7,640,090 B2 * | 12/2009 | Uchida et al. | 297/216.12 X |
| 7,883,148 B2 * | 2/2011 | Alexander et al. | 297/216.12 |
| 7,926,871 B2 * | 4/2011 | Meixner et al. | 297/216.12 |
| 2002/0195846 A1 * | 12/2002 | Masuda et al. | 297/216.12 |
| 2003/0030309 A1 * | 2/2003 | Pal et al. | 297/216.12 |
| 2003/0122409 A1 * | 7/2003 | Pal et al. | 297/216.12 |
| 2003/0160481 A1 * | 8/2003 | Veine et al. | 297/216.12 |
| 2004/0070239 A1 * | 4/2004 | Dellanno | 297/216.12 |
| 2004/0174053 A1 * | 9/2004 | Schmale | 297/216.12 |
| 2005/0006941 A1 | 1/2005 | Park | |
| 2005/0077762 A1 * | 4/2005 | Kraemer et al. | 297/216.12 |
| 2005/0264052 A1 * | 12/2005 | Dellanno | 297/216.12 |
| 2007/0096516 A1 * | 5/2007 | Heeg et al. | 297/216.12 |
| 2007/0246979 A1 * | 10/2007 | Browne et al. | 297/216.12 |
| 2008/0277990 A1 | 11/2008 | Yasukawa et al. | |
| 2009/0008973 A1 * | 1/2009 | Browne et al. | 297/216.12 |
| 2009/0250981 A1 | 10/2009 | Matsui | |
| 2010/0140987 A1 * | 6/2010 | Alexander et al. | 297/216.12 |
| 2010/0171349 A1 * | 7/2010 | Dellanno | 297/216.12 |

FOREIGN PATENT DOCUMENTS

| | | |
|---|---|---|
| JP | 62-42834 | 11/1987 |
| JP | 1-161969 | 11/1989 |
| JP | 2-222801 | 9/1990 |
| JP | 5-46554 | 6/1993 |
| JP | 10-138813 | 5/1998 |
| JP | 2000-335301 | 12/2000 |
| JP | 2001-227936 | 8/2001 |
| JP | 2005-28142 | 2/2005 |
| JP | 2005-212596 | 8/2005 |
| JP | 2005-271861 | 10/2005 |
| JP | 2006-212322 | 8/2006 |
| JP | 2006-219076 | 8/2006 |

OTHER PUBLICATIONS

English language Abstract of JP 2006-219076, Aug. 24, 2006.
English language Abstract of JP 2001-227936, Aug. 24, 2001.
English language Abstract of JP 2-222801, Sep. 5, 1990.
English language Abstract of JP 2005-212596, Aug. 11, 2005.
English language Abstract of JP 2005-28142, Feb. 3, 2005.
English language Abstract of JP 10-138813, May 26, 1998.
English language Abstract of JP 2006-212322, Aug. 17, 2006.
English language Abstract of JP 2005-271861, Oct. 6, 2005.

* cited by examiner

VEHICLE SEAT

TECHNICAL FIELD

The present invention relates to a vehicle seat in which a head rest can be moved forwardly so as to be positioned closer to a head of a passenger sitting thereon when a back-side collision of a vehicle is detected.

BACKGROUND ART

A vehicle seat having such a head rest of this type is already known and is described in, for example, Japanese Laid-Open Patent Publications Nos. 10-138813 and 2006-212322. In the technique of Publication No. 10-138813, a pressure receiving plate is disposed in a seat back. The pressure receiving plate is pressed by a body of a passenger sitting on the seat when a back-side collision happens, so that the head rest can be unlocked. Upon unlocking, a spring force acting on a support frame of the head rest is released, so that the head rest can be moved forwardly.

In the technique of Publication No. 2006-212322, a head rest is divided into a front side portion and a rear side portion. The front and rear side portions are connected to each other via an X-link. A drive mechanism of the X-link can be actuated based on a signal from a collision prediction sensor, so as to move the front side portion of the head rest forwardly.

In the technique disclosed in Publication No. 10-138813, when the passenger wildly sits on the seat or when the passenger knees the seat back, the pressure receiving plate can be unexpectedly pressed. Further, in the technique disclosed in Publication No. 2006-212322 in which the signal from the collision prediction sensor or a collision detection sensor is utilized, if a threshold value of the sensor is reduced to increase responsiveness of the sensor such that the sensor can be highly responsive to a low speed back-side collision, possibility of a malfunction of the head rest can be increased.

Thus, there is a need in the art to operate a head rest based on detection signals from two sensors, thereby preventing a malfunction of the head rest and in particular, preventing the malfunction of the head rest even if responsiveness of the sensor to a low speed back-side collision is increased.

Further need is to operate the head rest only when a back-side collision of a vehicle is detected at both sides of a seat.

Further need is to increase the responsiveness of the sensors in order to detect the back-side collision of the vehicle.

Further need is to dispose an acceleration sensor, i.e., one of the two sensors, at a position closer to a vehicle body in order to accurately detect the back-side collision of the vehicle.

Further need is to detect an acceleration closer to a value of an acceleration applied to a passenger sitting on the seat by means of the acceleration sensor.

SUMMARY OF THE INVENTION

A vehicle seat includes a first sensor that is disposed inside a seat back and is capable of detecting a back-side collision of a vehicle when pressed by a body of a sitting passenger, and a second sensor that is capable of detecting the back-side collision of the vehicle based on a longitudinal acceleration of the vehicle. A head rest is constructed to be moved forwardly based on detection signals when both of the sensors detect the back-side collision of the vehicle.

The head rest is operated using the detection signals transmitted from the sensors as AND operation conditions. Therefore, for example, even when the passenger wildly sits on the seat and the rod 2R can be pressed, a malfunction of the head rest can be prevented. In addition, even if threshold values of the sensors are reduced to increase responsiveness of the sensors, the malfunction of the head rest can be prevented.

Preferably, the first sensor and the second sensor are respectively oppositely disposed in a widthwise direction of the seat.

The sensors are respectively separately positioned in a widthwise direction of the seat. Therefore, the head rest can be moved only when the back-side collision of the vehicle is detected on both sides of the seat. As a result, the malfunction of the head rest can be more reliably prevented.

More preferably, the first sensor includes a position detection sensor that is actuated when pressed by the body of the sitting passenger. A biasing force for maintaining this sensor in an inactive condition is set to a force that is required to restore the same from an active condition to the inactive condition.

Thus, the position detection sensor cannot be applied with an excessive biasing force. As a result, the position detection sensor may have increased responsiveness.

More preferably, the position detection sensor includes a rotation angle detection sensor that is attached to one of right and left sides of a back frame of the seat back. One end of a rod is connected to this sensor. The other end of the rod is connected to the other of the right and left sides of the back frame. When the rod is pressed by the body of the sitting passenger at the time of the back-side collision of the vehicle, a rotational force can be applied to the rotation angle detection sensor, so that the back-side collision of the vehicle can be detected.

The rod for transmitting movement of the body of the sitting passenger to the rotation angle sensor is disposed so as to extend between right and left sides of the back frame. Therefore, in a normal sitting condition of the passenger, a pressing force is not scarcely applied to the body. As a result, a sitting comfort of the seat can be suitably maintained.

More preferably, the rotation angle detection sensor as the position detection sensor has a wire that is wound up therein. One end of the wire is connected to the other of the right and left sides of the back frame. When the wire is pulled by the body of the sitting passenger at the time of the back-side collision of the vehicle, a portion of the wire that is previously wound up in the rotation angle detection sensor is pulled out, so that a rotational force can be applied to the rotation angle detection sensor and as a result, the back-side collision of the vehicle can be detected.

More preferably, the position detection sensor includes a Hall IC sensor or an on-off type switch that is attached to a back frame of the seat back. An end portion of a mat spring protrudes in front of the front surface of the Hall IC sensor in conjunction with movement of the body of the sitting passenger at the time of the back-side collision of the vehicle. Conversely, the on-off type switch is switched by a spring member of the back frame that is capable of moving in conjunction with movement of the body of the sitting passenger at the time of the back-side collision of the vehicle. Thus, the back-side collision of the vehicle can be detected.

Thus, at the time of the back-side collision of the vehicle, the body of the sitting passenger can be caught by the wire or the spring member of the back frame. Therefore, in the normal sitting condition of the sitting passenger, the pressing force applied to the body of the passenger can be reduced.

More preferably, the second sensor includes an acceleration sensor. The acceleration sensor is disposed on a slide rail that is capable of adjusting a longitudinal position of the seat.

Thus, both of the sensors are disposed on the seat side. However, the acceleration sensor is disposed closer to the vehicle body. Therefore, the back-side collision of the vehicle can be accurately detected.

More preferably, the acceleration sensor is disposed on an upper rail of the slide rail.

The acceleration sensor is disposed on the upper rail of the slide rail that is positioned closer to the sitting passenger. An acceleration closer to an acceleration actually applied to the sitting passenger can be detected.

More preferably, the acceleration sensor is disposed on the slide rail that is positioned adjacent to a central portion of the vehicle.

Therefore, even if the vehicle spins at the time of the back-side collision, an actual longitudinal acceleration thereof can be accurately detected in the central portion of the vehicle.

More preferably, a head rest moving mechanism for moving the head rest has a biasing force that is capable of constantly moving the head rest forwardly. The head rest moving mechanism is normally locked and is capable of being unlocked based on the detection signals when both of the first sensor and the second sensor detect the back-side collision of the vehicle More preferably, the head rest moving mechanism includes a connection link movably supporting the head rest, and an elongated hole capable of guiding a connection shaft integrally provided to the head rest in order to control a posture of the head rest in cooperation with the connection link when the head rest is moved. The elongated hole is shaped such that the connection shaft at the time the head rest is moved forwardly can be guided from a normal position to a collision adaptable position at the time the back-side collision of the vehicle is detected

Figure 1:
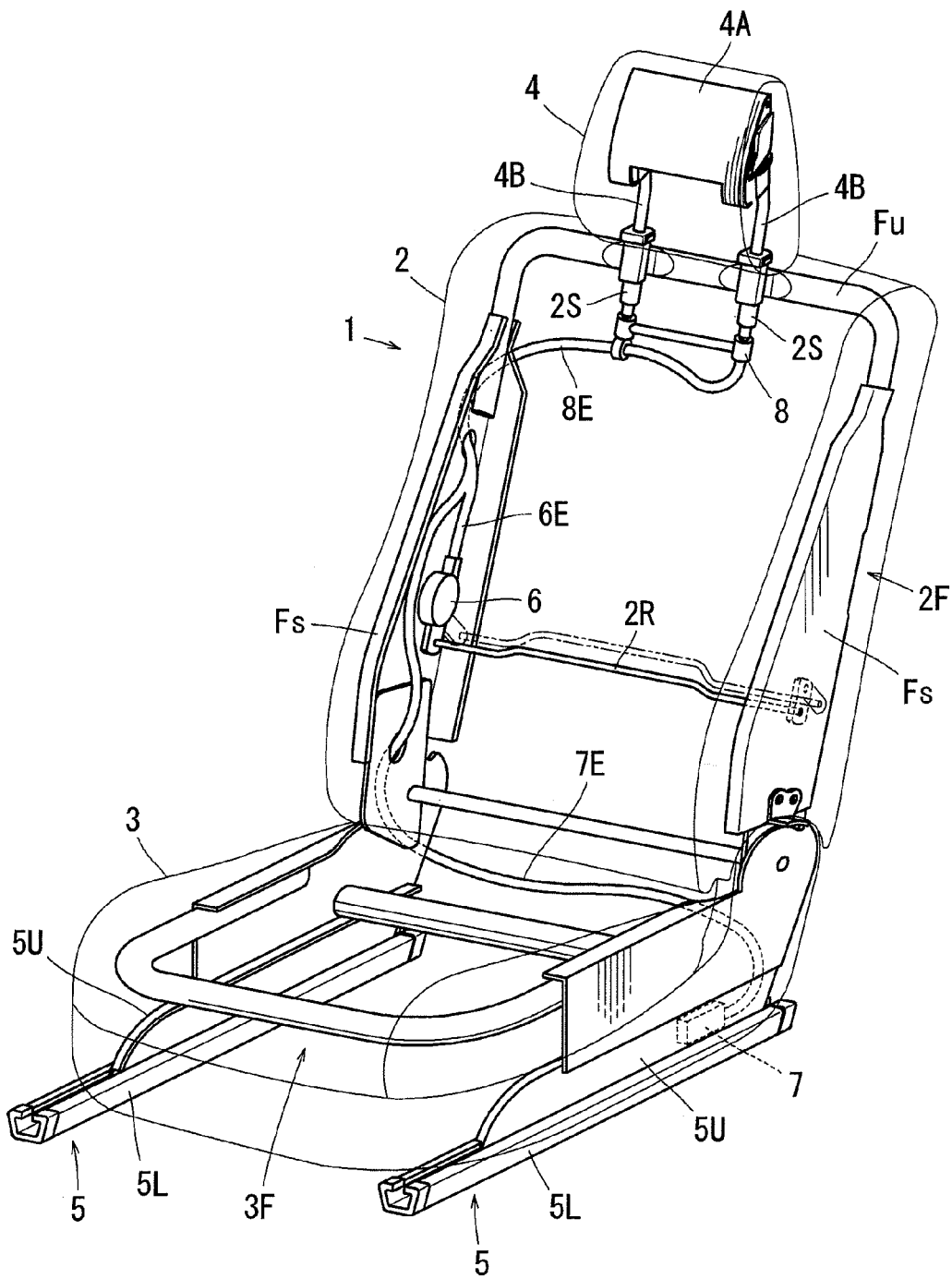
FIG. 1 is a perspective view of an inner structure of a vehicle seat according to Embodiment 1.

REFERENCE NUMERALS 1 seat
2 seat back
3 seat cushion
4 head rest
6 position detection sensor (first sensor)
7 acceleration sensor (second sensor)
10 head rest moving mechanism
12 connection link
20 drive device

BEST MODE FOR CARRYING OUT THE INVENTION

In the following, a best mode for carrying out the present invention will be described with reference to the drawings.

First, Embodiment 1 of the present invention will be described with reference to FIGS. 1 to 11.

FIG. 1 shows a whole structure of a seat 1. The seat 1 is essentially constructed of a seat back 2, a seat cushion 3, and a head rest 4 that is disposed on an upper surface portion of the seat back 2. As will be well known in the art, a back frame 2F constituting a framework of the seat back 2 and a cushion frame 3F constituting a framework of the seat cushion 3 are connected to each other via reclining devices (not shown). A back and forth tilt angle of the seat back 2 can be adjusted due to operation of the reclining devices.

Figure 2:
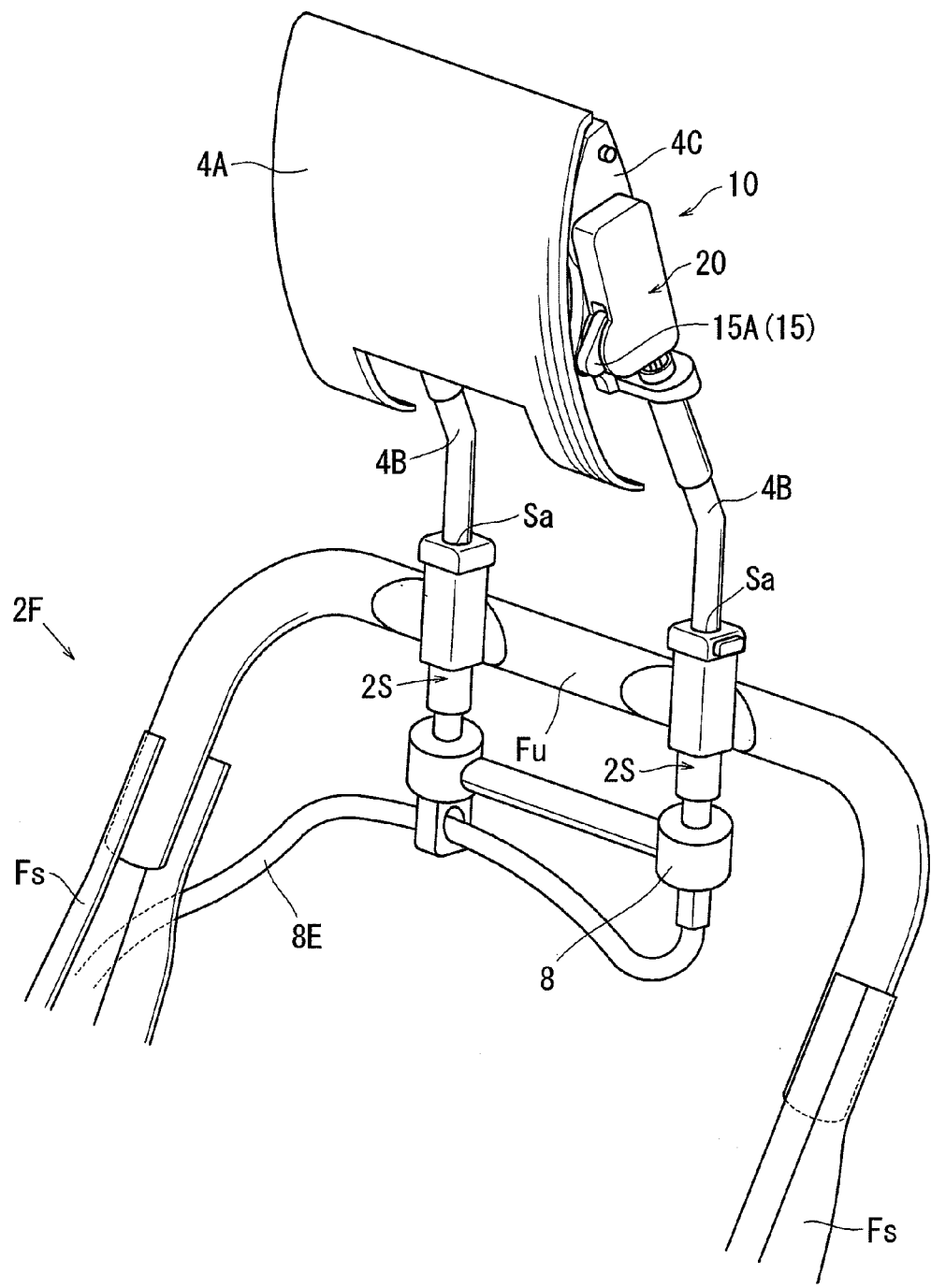
FIG. 2 is a perspective view of an inner structure of a head rest according to Embodiment 1.

As will be apparent from FIG. 2, the head rest 4 has a pair of stays 4B that extend downwardly from a lower portion thereof. Conversely, a pair of cylindrical supports 2S are attached to an upper frame Fu of the back frame 2F of the seat back 2. The stays 4B are respectively inserted into insertion holes Sa of the supports 2S from above. Thus, the head rest 4 is attached to the upper surface portion of the seat back 2.

The head rest 4 is normally retained in a predetermined position in which the head rest 4 can receive a head of a sitting passenger from behind. To the contrary, at the time of a back-side collision of a vehicle, a support portion 4A positioned on a front surface side of the head rest 4 can instantaneously move forwardly toward the head of the sitting passenger. As a result, the head of the sitting passenger is supported when the back-side collision happens, so that a load applied to a neck portion of the passenger can be reduced. Function and construction of the head rest 4 will be described in detail hereinafter.

The seat cushion 3 is supported on a vehicle floor via right and left slide rails 5 (FIG. 1). The slide rails 5 are respectively composed of lower rails 5L fixed to an upper surface of the floor and upper rails 5U fixed to both sides of a lower surface of the cushion frame 3F. The upper rails 5U can respectively slide along the lower rails 5L, so that a longitudinal position of the seat 1 can be adjusted.

A position detection sensor 6 capable of detecting a change of a rotation angle is attached to an inner side of one of side frames Fs of the back frame 2F. The sensor 6 may function as a first sensor for detecting the back-side collision of the vehicle. A rod 2R extends between the position detection sensor 6 and an inner side of the other of the side frames Fs. One end of the rod 2R is connected to an input portion of the position detection sensor 6. Conversely, the other end of the rod 2R is rotatably connected to the other of the side frames Fs. When the rod 2R is pressed by a body of the sitting passenger so as to be moved as indicated by broken lines in FIG. 1, a rotational force around a horizontal axis can be applied to the position detection sensor 6. As a result, the back-side collision of the vehicle can be detected from a rotation angle of the sensor 6.

When the back-side collision happens, the body of the sitting passenger relatively moves rearwardly with respect to the seat 1 so as to sink into the seat back 2. The position detection sensor 6 detects a sinking amount of the body into the seat back 2 when the back-side collision of the vehicle happens. Further, the sinking amount of the body into the seat back 2 depends on physical constitution of the sitting passenger or other such factors. Therefore, the rod 2R may preferably be positioned so as to correspond to a waist of the sitting passenger.

An acceleration sensor 7 capable of detecting a longitudinal acceleration of the vehicle is attached to the upper rail 5U of one of the right and left slide rails 5, i.e., the slide rail 5 that is positioned inside of the seat cushion 3 (the seat 1). The acceleration sensor 7 may function as a second sensor for detecting the back-side collision of the vehicle. The acceleration sensor 7 detects the back-side collision of the vehicle based on the longitudinal acceleration of the vehicle. Therefore, in order to increase responsiveness of the sensor 7, it is preferred that the sensor 7 is attached to the slide rail 5 positioned closer to the vehicle floor. Further, the acceleration sensor 7 is attached to the slide rail 5 that is positioned inside of the seat cushion 3, i.e., the slide rail 5 that is positioned adjacent to a central portion of the vehicle. Therefore, if the vehicle spins at the time of the back-side collision, an actual longitudinal acceleration thereof can be accurately detected. Further, the upper rails 5U of the slide rails 5 cannot substantially be moved except when the seat 1 is longitudinally slid to be adjusted. This may also contribute to an increase of detection capability of the sensor 7.

An electrical cable 7E for transmitting a signal from the acceleration sensor 7 is led into one of side frames Fs of the back frame 2F from the cushion frame 3F side. The electrical cable 7E is bundled with an electrical cable 6E for transmitting a signal from the position detection sensor 6, thereby forming an electrical cable 8E within the side frames Fs. The electrical cable 8E is drawn out the side frames Fs and is connected to a connector 8 that is attached to lower ends of the stays 4B of the head rest 4.

Because the electrical cable 8E is connected to the connector 8, detection signals from the position detection sensor 6 and the acceleration sensor 7 can be input to a control device (not shown) for driving a drive device 20 of a head rest moving mechanism 10, which will be described hereinafter. Further, these detection signals can be input thereto as AND operation conditions.

Figure 11:
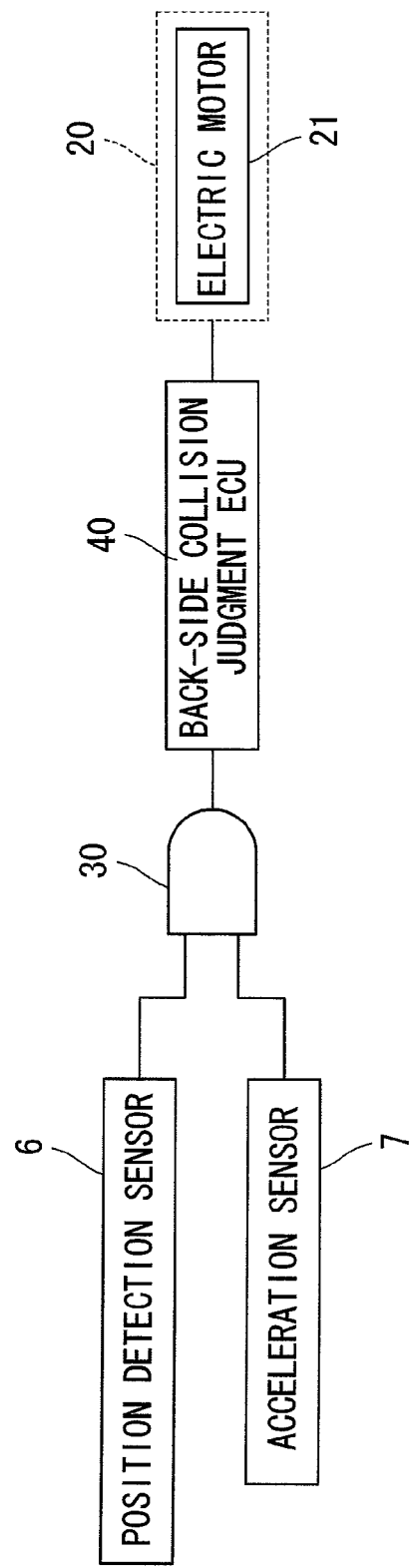
FIG. 11 is a block diagram which illustrates a control circuit for actuating an electric motor when a back-side collision of a vehicle happens, which includes detection sensors.

As will be apparent from FIG. 11 in which the control circuit is shown by a block diagram, electric signals that are respectively detected by the position detection sensor 6 and the acceleration sensor 7 are input to a back-side collision judgment ECU 40 via an AND circuit 30. The back-side collision judgment ECU 40 determines if the back-side collision happens. When the ECU 40 determines that the back-side collision happens, power is supplied to an electric motor 21 of the drive device 20, so as to drive the electric motor 21.

Figure 5:
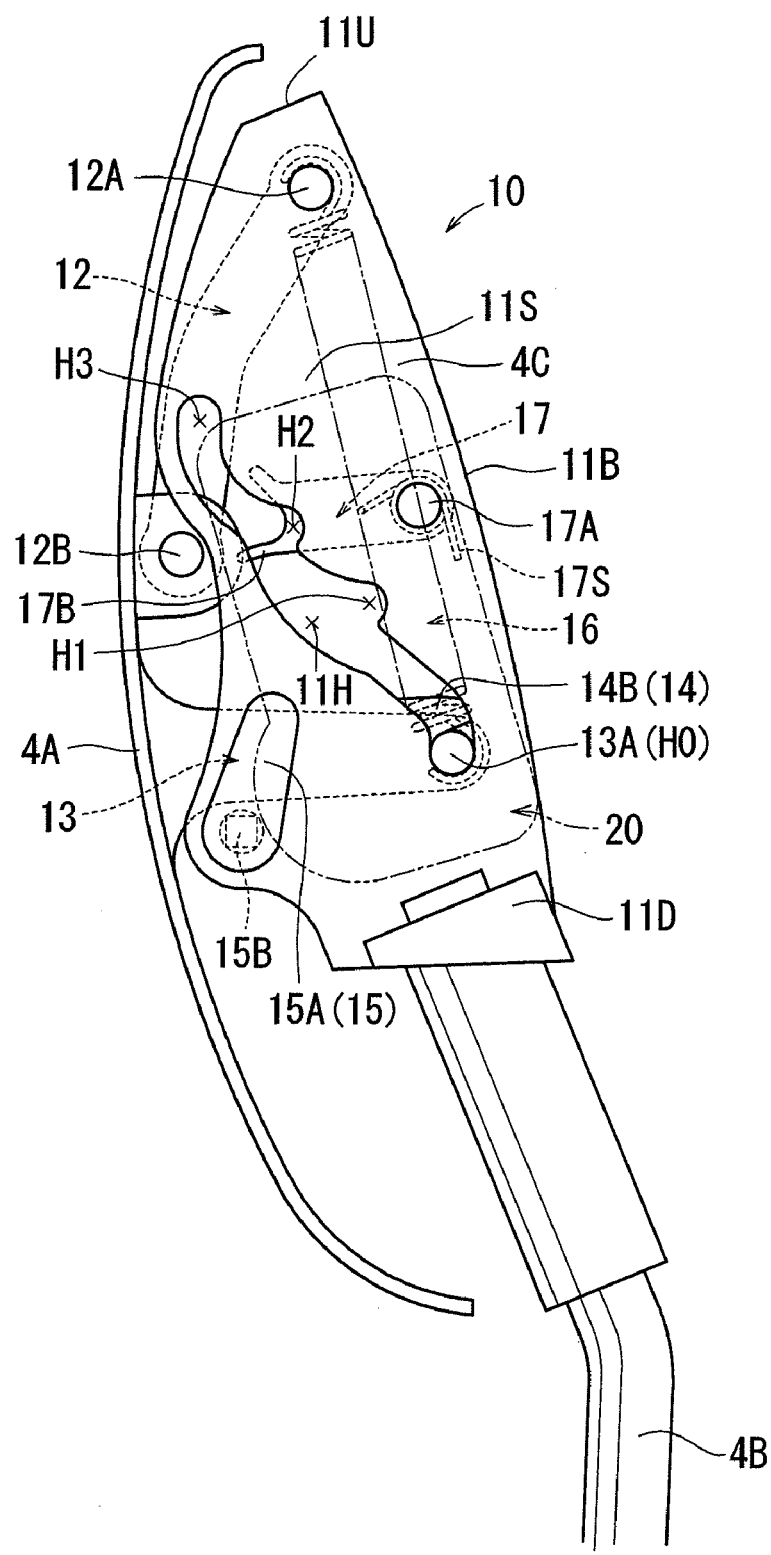
FIG. 5 is a side view of the head rest according to Embodiment 1, which illustrates a condition in which a support portion of the head rest is retained in an initial position.

The head rest moving mechanism 10 functions to move the support portion 4A of the head rest 4 forwardly when the back-side collision of the vehicle happens. The head rest moving mechanism 10 is incorporated into the head rest 4. As shown in FIG. 5, the head rest moving mechanism 10 normally retains the support portion 4A in an initial position in which the support portion 4A is restricted from moving forwardly. A tension spring 16 is disposed between the support portion 4A and a head rest base portion 4C that is formed integrally with the stays 4B. The support portion 4A is constantly biased forwardly by the tension spring 16 so as to move toward the head of the sitting passenger. That is, regardless of biasing action of the tension spring 16, the head rest moving mechanism 10 is normally locked so as to retain the support portion 4A in the initial position.

When the back-side collision of the vehicle happens, a locked condition of the head rest moving mechanism 10 which restricts the support portion 4A from moving forwardly is released, so that the head rest moving mechanism 10 moves the support portion 4A forwardly due to the biasing action of the tension spring 16. As described hereinafter, the head rest moving mechanism 10 moves the support portion 4A forwardly and upwardly along profiles of elongated holes 11H and 11H formed in the head rest base portion 4C, so as to move the support portion 4C to a position shown in FIG. 8, i.e., a position immediately behind the back of the head of the sitting passenger. The head rest moving mechanism 10 is constructed so as to not be pushed back when the head rest moving mechanism 10 is in a collision adaptable condition in which the support portion 4A is moved to the position in FIG. 8, even if the support portion 4A is applied with a load due to rearward tilting motion of the head at the time of the back-side collision. As a result, the head of the sitting passenger can be reliably received by the support portion 4A that is positioned in a collision adaptable position.

Figure 3:
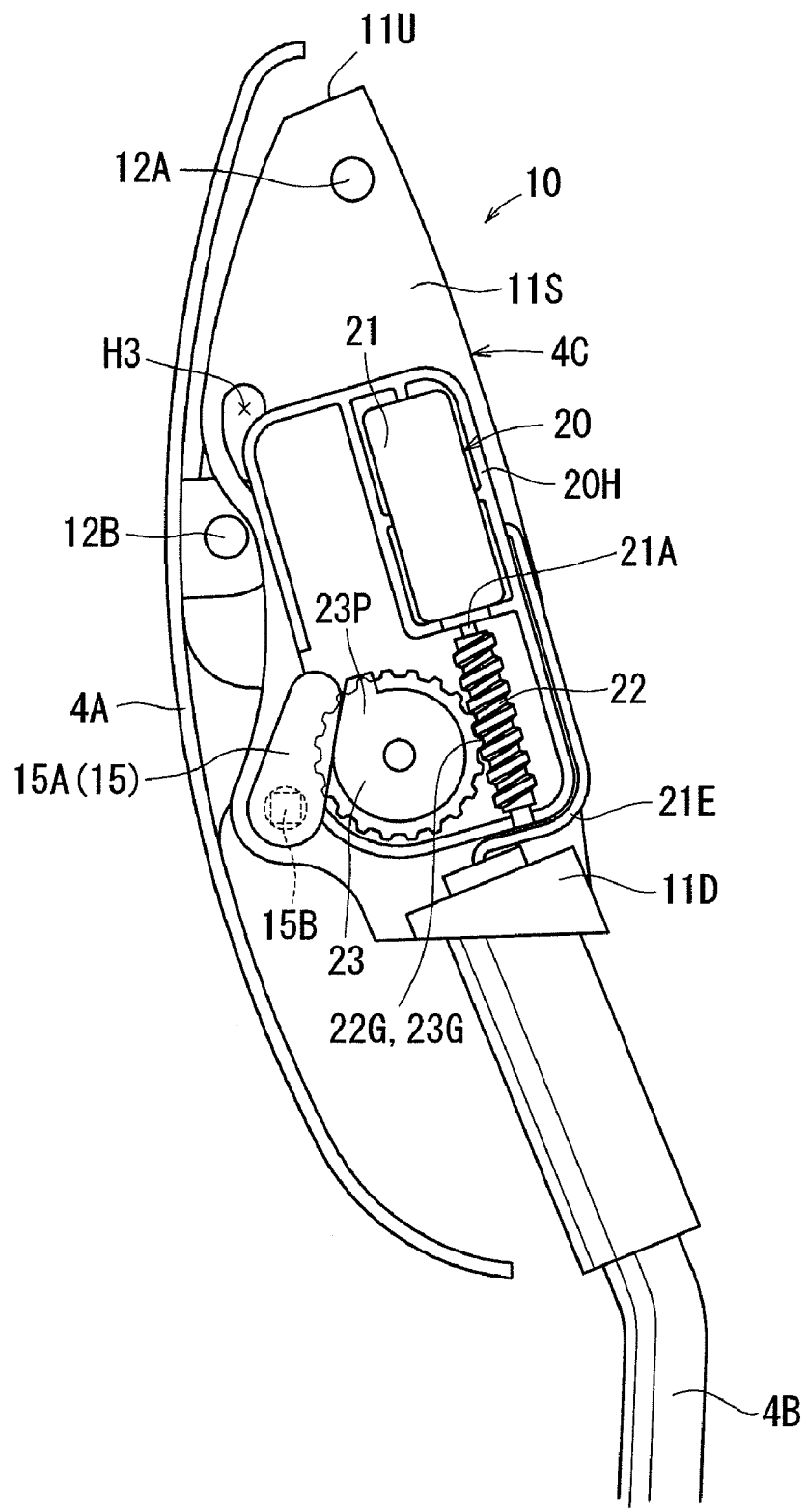
FIG. 3 is a side view of an inner structure of a drive device according to Embodiment 1.

The locked condition of the head rest moving mechanism 10 which restricts the support portion 4A from moving forwardly can be released when the drive device 20 provided to a side surface portion of the head rest 4 is electrically operated. As shown in FIG. 3, the drive device 20 is attached to a side surface portion 11S of the head rest base portion 4C. The drive device 20 is constructed to electrically operate an engagement-disengagement member 15 (an operation arm portion 15A) that is provided as an operating member of the head rest moving mechanism 10, thereby releasing a movement restricting condition of the support portion 4A. The drive device 20 has a case 20H made of resin, a rotary electric motor 21, a worm 22 composed of a screw gear, and a worm wheel 23 composed of a helical gear and meshing with the worm 22. The case 20H is secured to the side surface portion 11S of the head rest base portion 4C and contains the electric motor 21, the worm 22 and the worm wheel 23 therein.

The worm 22 is directly connected to a drive shaft 21A of the electric motor 21 in the case 20H. The worm 22 has a tooth portion 22G that is formed in an outer circumferential surface thereof. The toothed portion 22G spirally extends in an axial direction of the worm 22. The tooth portion 22G is meshed with a tooth portion 23G of the worm wheel 23. Therefore, when the electric motor 21 is driven, the worm 22 can rotate, thereby rotating the worm wheel 23 meshed therewith.

The worm wheel 23 has a cam-shaped pusher cam 23P. The pusher cam 23P can push and rotate the operation arm portion 15A (the engagement-disengagement member 15) counterclockwise in the drawing when the worm wheel is rotated. When the worm wheel 23 is rotated counterclockwise in the drawing, the pusher cam 23P rotates the operation arm portion 15A in a direction that can release the movement restricting condition of the support portion 4A.

Figure 7:
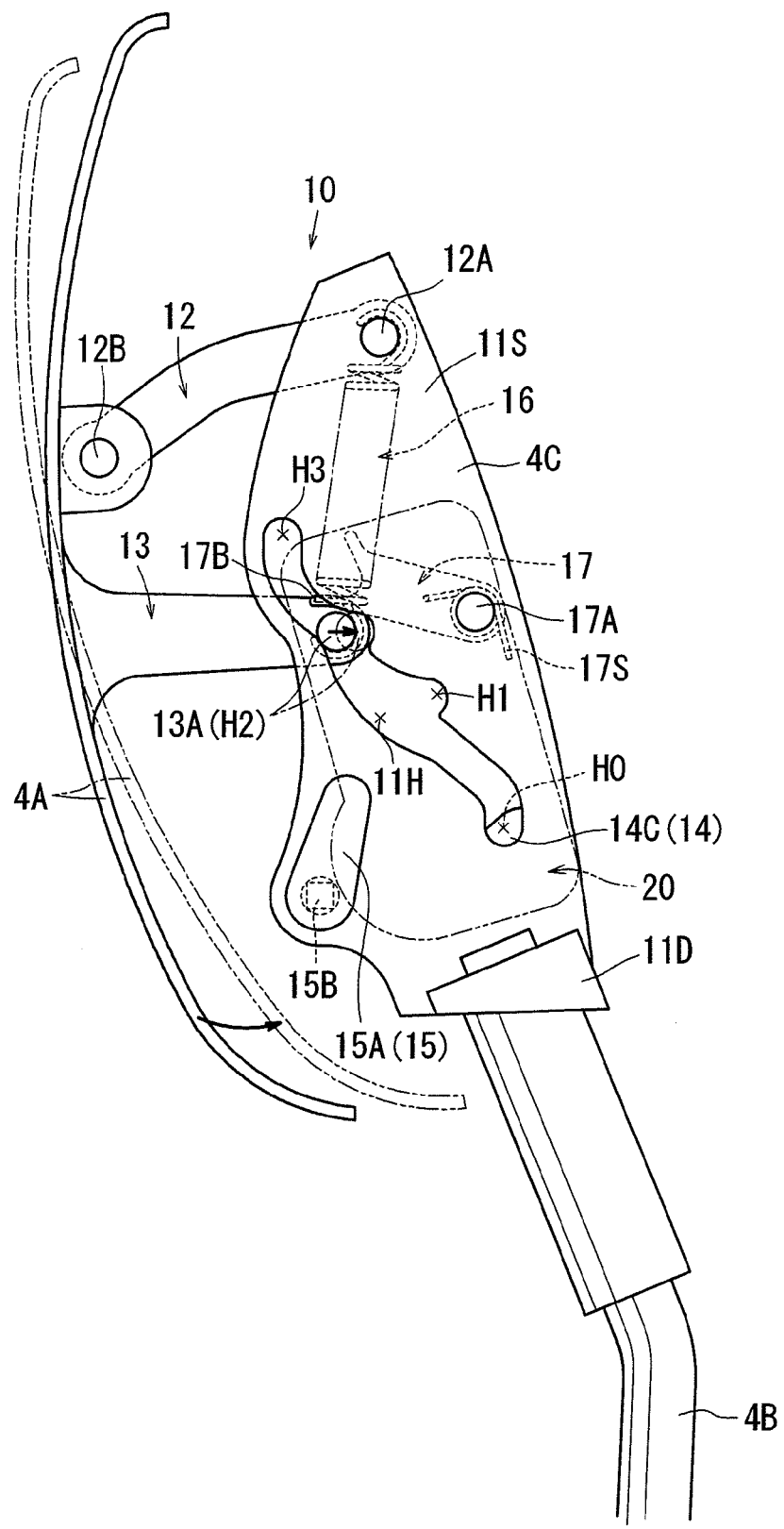
FIG. 7 is a side view of the head rest according to Embodiment 1, which illustrates an intermediate condition in which the support portion of the head rest is moved from the condition in FIG. 5 toward a head.
Figure 8:
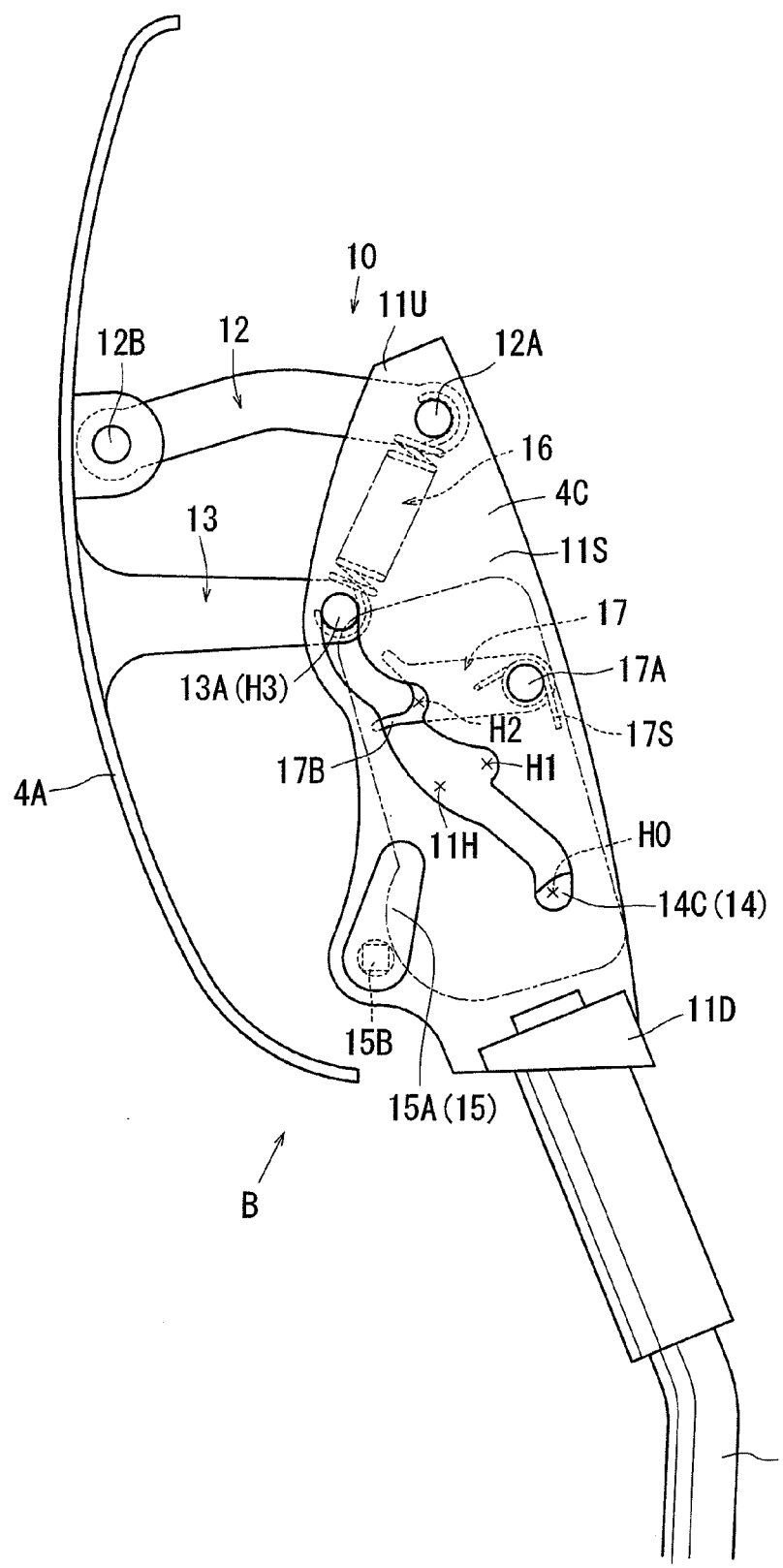
FIG. 8 is a side view of the head rest according to Embodiment 1, which illustrates a final condition in which movement of the support portion of the head rest toward the head is completed.

Although construction of the head rest moving mechanism 10 is shown in each of FIGS. 4 to 20, the construction thereof is best shown in FIG. 8. Therefore, the construction thereof will be described with reference to this drawing.

The head rest moving mechanism 10 is disposed so as to be associated with the head rest base portion 4C and the support portion 4A. The head rest moving mechanism 10 includes connection links 12, support members 13, hooks 14 and lever members 17. These members are respectively disposed in pairs in a widthwise direction. Further, the head rest moving mechanism 10 includes the engagement-disengagement member 15 and the tension spring 16.

The head rest base portion 4C is formed of synthetic resin. The head rest base portion 4C is composed of a plate-shaped rear surface portion 11B, a bottom surface portion 11D, side surface portions 11S and an upper surface portion 11U that are integrally connected to each other. The bottom surface portion 11D extends forwardly from a lower end periphery of the rear surface portion 11B. The side surface portions 11S are positioned on both sides of the head rest base portion 4C in a widthwise direction thereof. The upper surface portion 11U connects upper peripheries of the side surface portions 11S.

Figure 4:
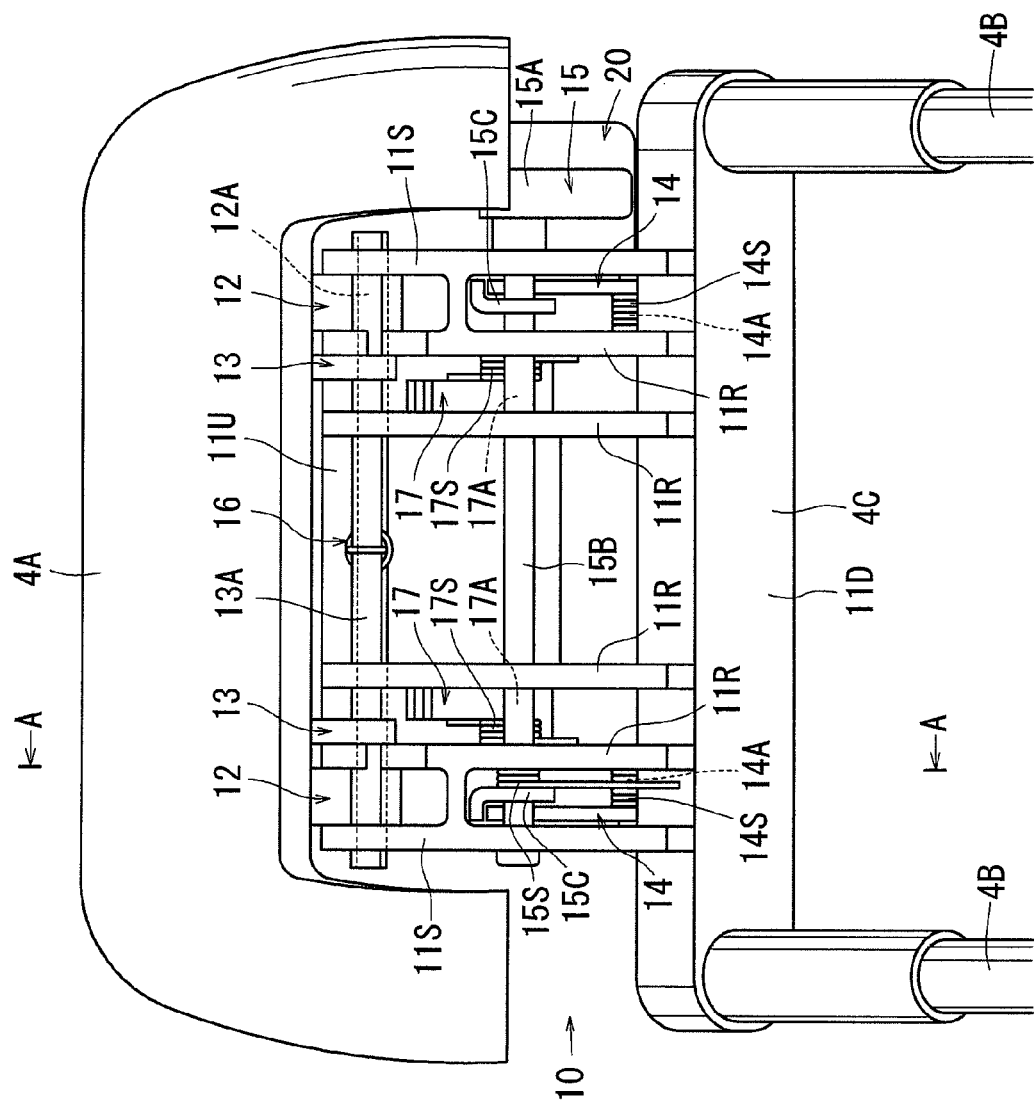
FIG. 4 is a structural front view of a head rest moving mechanism according to Embodiment 1, which is obliquely viewed from below.

As shown in FIG. 4 in which the head rest 4 obliquely viewed from below in a front side thereof, a plurality of plate-like ribs 11R are formed in the head rest base portion 4C. The ribs 11R are positioned between the side surface portions 11S so as to be in parallel therewith. Thus, the head rest base portion 4C can be reinforced. Upper end portions of the stays 4B are respectively inserted into the bottom surface portion 11D, so that the head rest base portion 4C can be integrally connected to the stays 4B. The stays 4B are respectively formed in tubular shapes and are attached to the head rest base portion 4C while upper side openings thereof are exposed to an upper surface side of the bottom surface portion 11D. Wave-shaped elongated holes 11H are formed in the side surface portions 11S of the head rest base portion 4C. The elongated holes 11H are formed by cutting out the side surface portions 11S in a thickness direction thereof. Each of the elongated holes 11H has a first stopper groove H1 and a second stopper groove H2 that are formed between a lower end portion H0 and an upper end portion H3 thereof. The first and second stopper grooves H1 and H2 are depressed rearwardly (rightwardly in the drawing) in a wave-like and step-like fashion.

A pair of connection links 12 are formed of synthetic resin. The connection links 12 may function as connection members that links the head rest base portion 4C and the support portion 4A to each other. The connection links 12 are positioned so as to be spaced from each other in the widthwise direction, and front and rear end portions of each of the connection links 12 are respectively connected to an upper end portion of the head rest base portion 4C and a rear surface side portion of the support portion 4A.

The rear end portions of the connection links 12 are respectively rotatably supported by a connection shaft 12A that passes through the side surface portions 11S of the head rest base portion 4C. More specifically, as shown in FIG. 4, the rear end portions of the connection links 12 are positioned between the side surface portions 11S and the ribs 11R positioned inside thereof, so as to be rotatably supported by the connection shaft 12A extending therebetween.

As shown in FIG. 8, the front end portions of the connection links 12 are rotatably supported by a connection shaft 12B that is disposed on the rear surface side portion of the support portion 4A and extends in the widthwise direction. The connection shafts 12A and 12B are positioned so as to be parallel to each other. The connection links 12 are arranged to contact the upper surface portion 11U of the head rest base portion 4C when they are rotated clockwise from conditions shown in FIG. 5 about the connection shaft 12A rotatably supporting the rear end portions thereof, so as to be precluded from rotating clockwise.

A pair of support members 13 extend rearwardly from a rear surface side of the support portion 4A and are integrally connected to the support portion 4A. The support members 13 are positioned so as to be spaced from each other in the widthwise direction of the support portion 4A. The support portion 4A is formed by integral molding of synthetic resin so as to have a curved plate-shape as a whole. The rear surface side of the support portion 4A is integrally formed with the support members 13 and support portions for rotatably supporting the connection shaft 12B.

Rear end portions of the support members 13 are integrally connected with each other by a connection shaft 13A that extends in the widthwise direction. In particular, as shown in FIG. 4, the rear end portions of the support members 13 are positioned between the ribs 11R positioned outside thereof and the ribs 11R positioned inside thereof and are connected to each other by the connection shaft 13A. The connection shaft 13A connecting the rear end portions of the support members 13 are positioned so as to be parallel to the connection shafts 12A and 12B. Respective end portions of the connection shaft 13A are passed through the elongated holes 11H that are formed in the side surface portions 11S of the head rest base portion 4C. Therefore, the connection shaft 13A is capable of moving back and forth and up and down only within a range defined by the profiles of the elongated holes 11H. Further, the ribs 11R (FIG. 4) formed between the side surface portions 11S are shaped so as to not interfere with the connection shaft 13A that moves within the elongated holes 11H.

Figure 6:
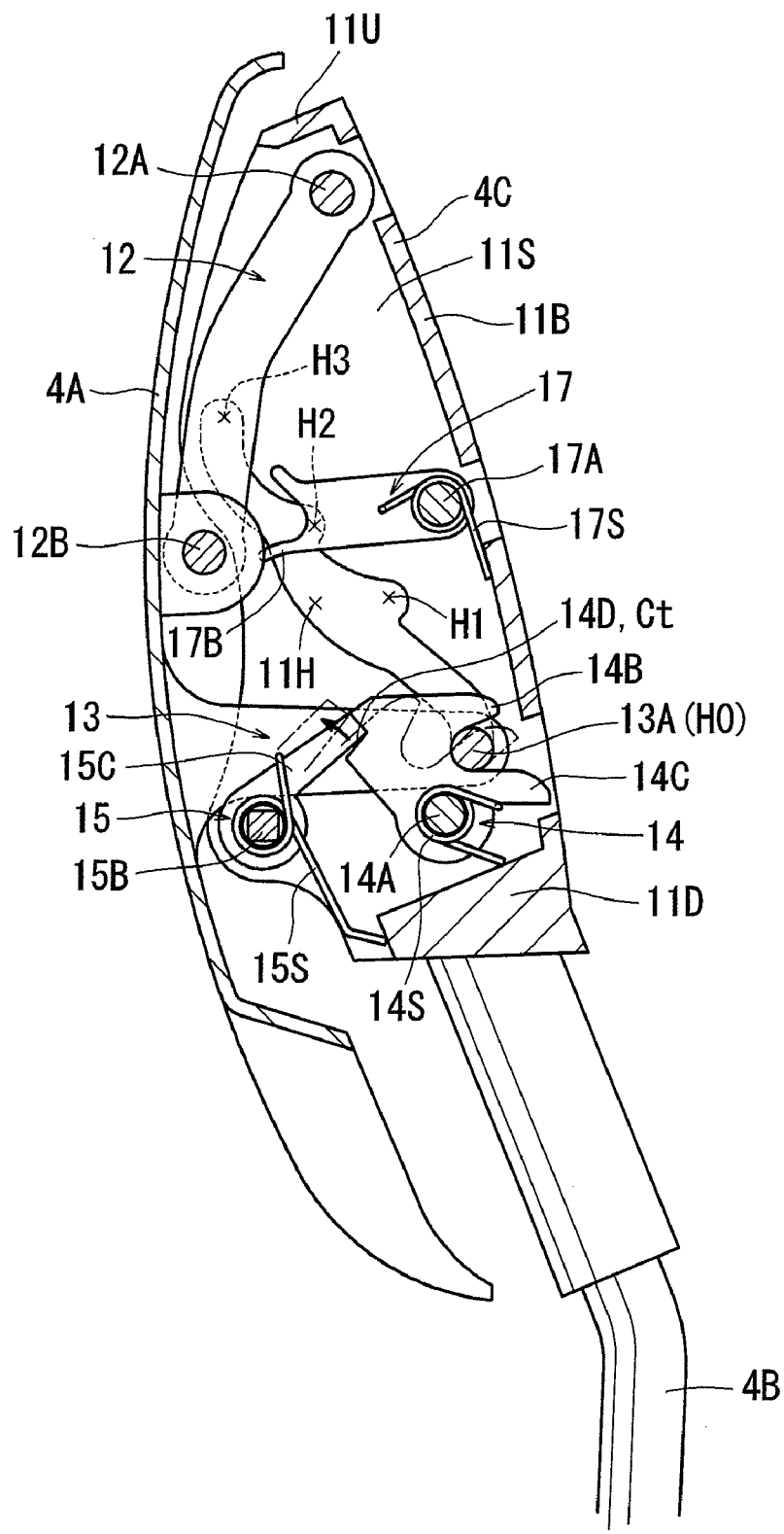
FIG. 6 is a schematic view viewed from a direction indicated by line A-A of FIG. 4.

A pair of hooks 14 shown in FIG. 6 are formed as metal components and is constructed to function as restriction members that are capable of restricting the connection shaft 13A from moving within the elongated holes 11H. The hooks 14 are formed to cam shapes as a whole and are positioned at a lower end portion of the head rest base portion 4C so as to be laterally spaced from each other. As shown in FIG. 4, the hooks 14 are positioned between the side surface portions 11S and the ribs 11R positioned inside thereof and are respectively rotatably supported by connection shafts 14A that extend therebetween. As shown in FIG. 6, each of the hooks 14 has an upper jaw portion 14B and a lower jaw portion 14C that respectively protrude radially outwardly. The upper jaw portion 14B and the lower jaw portion 14C are formed in two positions on an outer circumferential periphery of the hook 14. As a result, a recess is formed between the upper jaw portion 14B and the lower jaw portion 14C. As described hereinafter, the recess is shaped such that the connection shaft 13A connecting a pair of support members 13 can be received therein. The connection shafts 14A are positioned so as to be parallel to the connection shafts 12A and 12B and the connection shaft 13A.

Torsion springs 14S are respectively disposed between the hooks 14 and the head rest base portion 4C. The torsion springs 14S bias the hooks 14 to rotate the same counterclockwise in the drawing from conditions shown in FIG. 6. Step-shaped engagement grooves 14D are respectively formed in the outer circumferential peripheries of the hooks 14. The engagement grooves 14D are respectively shaped to be engaged with a pair of engagement arm portions 15C that constitute the engagement-disengagement members 15, which will be described hereinafter. Thus, counterclockwise rotation of the hooks 14 due to biasing action of the torsion springs 14S can be precluded.

In a condition in which the counterclockwise rotation of the hooks 14 is precluded, the hooks 14 can maintain the connection shaft 13A in a condition in which the connection shaft 13A is retained in the lower end portions H0 of the elongated holes 11H while the connection shaft 13A is received in the recesses formed between the upper jaw portions 14B and the lower jaw portions 14C. Further, as shown in FIG. 5, the connection shaft 13A is biased toward the connection shaft 12A by the tension spring 16 that is disposed between the connecting shaft 13A and the connection shaft 12A. Therefore, the connection shaft 13A is biased toward the upper end portions H3 along the profiles of the elongated holes 11H. Thus, the connection shaft 13A is maintained in the condition in which the connection shaft 13A is retained in the lower end portions H0 of the elongated holes 11H by the hooks 14 against a biasing force of the tension spring 16 (a condition in which the connection shaft 13A is retained in an initial position).

In FIG. 6, when the engagement arm portions 15C are rotated counterclockwise in the drawing and are disengaged from the hooks 14, the hooks 14 are rotated counterclockwise in the drawing by a biasing force of the torsion springs 14S. As a result, as shown by broken lines in FIG. 6, the upper jaw portions 14B of the hooks 14 are moved out of the elongated holes 11H, and the lower jaw portions 14C are pushed up from below, so as to be exposed to the elongated holes 11H. Thus, a condition in which the connection shaft 13A is retained by the hooks 14 is released. As a result, as shown in FIGS. 7 and 8, the connection shaft 13A moves forwardly and upwardly along the profiles of the elongated holes 11H by the biasing force of the tension spring 16. As a result, the support portion 4A relatively moves forwardly and upwardly with respect to the head rest base portion 4C while rotating the connection links 12.

In FIG. 6, the engagement arm portions 15C that can restrict the counterclockwise rotation of the hooks 14 are positioned so as to be laterally spaced from each other and are capable of engaging the hooks 14. In particular, as shown in FIG. 4, similar to the hooks 14, the engagement arm portions 15C are positioned between the side surface portions 11S and the ribs 11R positioned inside thereof. Further, the engagement arm portions 15C are rotatably supported by a connection shaft 15B that passes through the side surface portions 11S. The connection shaft 15B is integrally connected to the engagement arm portions 15C and is rotatably supported by the side surface portions 11S. The connection shaft 15B is positioned so as to be parallel to the connection shafts 12A and 12B and the connection shaft 13A.

A torsion spring 15S is disposed between one of the engagement arm portions 15C and the head rest base portion 4C. As shown in FIG. 6, the torsion spring 15S biases the engagement arm portions 15C to rotate the same clockwise in the drawing from a position in FIG. 6. As a result, the engagement arm portions 15C are normally pressed against the outer circumferential peripheries of the hooks 14, so as to be maintained in conditions in which engagement portions Ct formed in distal ends thereof respectively enter the step-shaped engagement grooves 14D. In the conditions in which the engagement portions Ct enter the engagement grooves 14D, the engagement arm portions 15C biased clockwise and the hooks 14 biased counterclockwise oppositely contact each other, so as to be mutually prevented from rotating relative to each other.

The operation arm portion 15A that is capable of rotating by power supply transmitted from the drive device 20 is integrally connected to the connection shaft 15B that is integrally connected to the engagement arm portions 15C. The operation arm portion 15A is connected to a right end portion of the connection shaft 15B in FIG. 4, i.e., an end portion shown in FIG. 3. As shown in FIG. 3, the operation arm portion 15A is formed by an arm-shaped member. When the back-side collision of the vehicle happens, the operation arm portion 15A is pushed by the pusher cam 23P formed in the worm wheel 23, so as to be rotated counterclockwise about the connection shaft 15B. As a result, the operation arm portion 15A rotates the engagement arm portions 15C (FIG. 6) integrated therewith in the same direction, thereby releasing a condition in which the support portion 4A is retained in the initial position.

At this time, a rotational driving force produced by an electric motor 21 can be reduced and transmitted via a reducing mechanism (worm gears) that is constructed of a meshing structure of the worm 22 and the worm wheel 23. Further, as will be recognized from FIGS. 3 and 6, the operation arm portion 15A is formed such that a portion of the operation arm portion 15A pressed by the pusher cam 23P has a radius of rotation greater than a radius of rotation of each of the engagement portions Ct of the engagement arm portions 15C. As a result, the rotational driving force supplied by the electric motor 21 can be increased, so as to be transmitted as a large force that is capable of disengaging the engagement arm portions 15C (FIG. 6) from the hooks 14.

That is, the engagement arm portions 15C oppositely contact the hooks 14 while the engagement arm portions 15C are respectively applied with biasing forces of the torsion springs 14S and the torsion spring 15S that can produce an engagement force to retain the connection shaft 13A in the initial position against the biasing action of the tension spring 16, so as to be positioned in engaging conditions. Therefore, in order to disengage the engagement arm portions 15C from the hooks 14, the engagement arm portions 15C must be rotated by a force that can overcome the biasing forces described above. In this embodiment, the reducing mechanism (the worm gears) is provided. The reducing mechanism is constructed of the meshing structure of the worm 22 and the worm wheel 23. In addition, the radius of rotation of the operation arm portion 15A is set to be different from the radius of rotation of each of the engagement arm portions 15C. Therefore, a reduction ratio of the rotational driving force can be increased. As a result, the rotational driving force produced by the electric motor 21 can be transmitted the engagement arm portions 15C as an increased force. Thus, at the time of the back-side collision of the vehicle, the engagement arm portions 15C can be smoothly disengaged from the hooks 14.

The electric motor 21 is relatively highly responsive and is capable of rotating at high speed. Therefore, even when the reduction ratio of the rotational driving force is increased as described above and the electric motor 21 is set to be driven after the back-side collision of the vehicle is detected, an engaging condition of the engagement-disengagement member 15 can be quickly released. For example, in this embodiment, response time from when the back-side collision of the vehicle happens till when the electric motor 21 is driven is 5 microseconds. Further, time required to release the conditions in which the engagement arm portions 15C and 15C engage the hooks 14 is 12 microseconds. Therefore, at the time of the back-side collision of the vehicle, the support portion 4A can be quickly moved forwardly due to the biasing force of the tension spring 16.

As shown in FIG. 8, the support portion 4A capable of moving forwardly due to the biasing force of the tension spring 16 can reach the condition in which the support portion 4A is precluded from moving when the connection shaft 13A reaches the upper end portions H3 of the elongated holes 11H. In this condition, the support portion 4A cannot be pushed back even if the support portion 4A is applied with a load from the head of the sitting passenger. That is, when the connection shaft 13A reaches the upper end portions H3 of the elongated holes 11H, the connection links 12 connecting the support portion 4A contact the upper surface portion 11U of the head rest base portion 4C, so as to be prevented from rotating clockwise in the drawing. In this condition, if the support portion 4A is applied with a force that pushes the same rearwardly, the connection link portions 12 are only pressed against the upper surface portion 11U of the head rest base portion 4C, and the connection link portions 12 cannot be pushed back counterclockwise in the drawing. Thus, in this collision adaptable position, the support portion 4A can stably catch the head of the sitting passenger.

As shown in FIG. 7, the support portion 4A cannot be pushed back if the support portion 4A is applied with the load from the head of the sitting passenger in the middle of forward moving thereof. That is, when the connection shaft 13A moving forwardly and upwardly within the elongated holes 11H is applied with a force that pushes the same rearwardly in the middle of forward moving thereof, the connection shaft 13A can enter the first stopper grooves H1 or the second stopper grooves H2 that are formed in the elongated holes 11H while depressed rearwardly (rightwardly in the drawing) in the step-like fashion. Further, FIG. 7 shows a condition in which the connection shaft 13A is positioned in the second stopper grooves H2 of the elongated holes 11H. As a result, rearward movement of the connection shaft 13A can be restricted, so that the support portion 4A can be prevented from being pushed back. Therefore, even when the support portion 4A does not yet reach the collision adaptable position, the head of the sitting passenger can be caught by the support portion 4A.

In FIG. 5, a pair of lever members 17 constructed of laterally elongated plate-shaped members are attached to the head rest base portion 4C. The lever members 17 are positioned so as to be laterally spaced from each other. Rear end portions of the lever members 17 are respectively rotatably connected to the head rest base portion 4C. In particular, as shown in FIG. 4, the rear end portions of the lever members 17 are positioned between the outer ribs 11R and the inner ribs 11R and are respectively rotatably supported by connection shafts 17A that extend therebetween.

Torsion springs 17S are disposed between the lever members 17 and the headrest base portion 4C. As shown in FIG. 5, the torsion springs 17S are disposed on the connection shafts 17A. One end of each of the torsion springs 17S is connected to each of the lever members 17. The other end of each of the torsion springs 17S is connected to the headrest base portion 4C. Thus, in free conditions of the lever members 17, the lever members 17 can respectively be maintained in conditions in which they are exposed to the elongated holes 11H by spring forces of the torsion springs 17S.

Spoon-shaped receiving portions 17B are respectively formed in distal end portions (left end portions in the drawing) of the lever members 17 that are exposed to the elongated holes 11H. As shown in FIG. 7, when the connection shaft 13A moves upwardly from the lower ends H0 within the elongated holes 11H, the receiving portions 17B are pushed away by the connection shaft 13A, so as to be pushed out of the elongated holes 11H. However, as shown in FIG. 8, when the connection shaft 13A reaches the upper end portions H3 of the elongated holes 11H, the receiving portions 17B are respectively returned to the conditions in which they are exposed to the elongated holes 11H by spring action of the torsion springs 17S.

Figure 9:
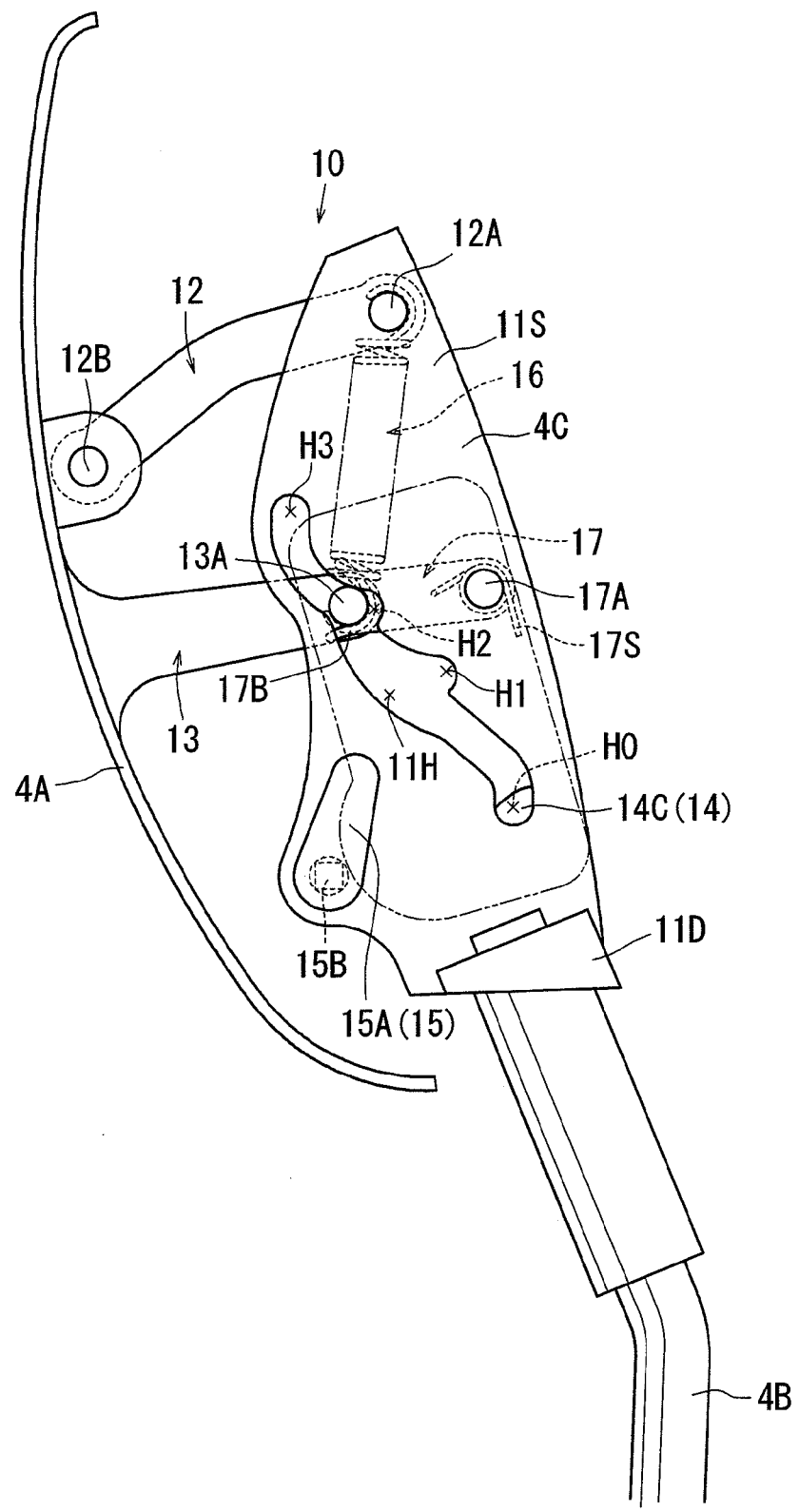
FIG. 9 is a side view of the head rest according to Embodiment 1, which illustrates an intermediate condition in which the support portion of the head rest is moved from the condition in FIG. 8 toward the initial position.
Figure 10:
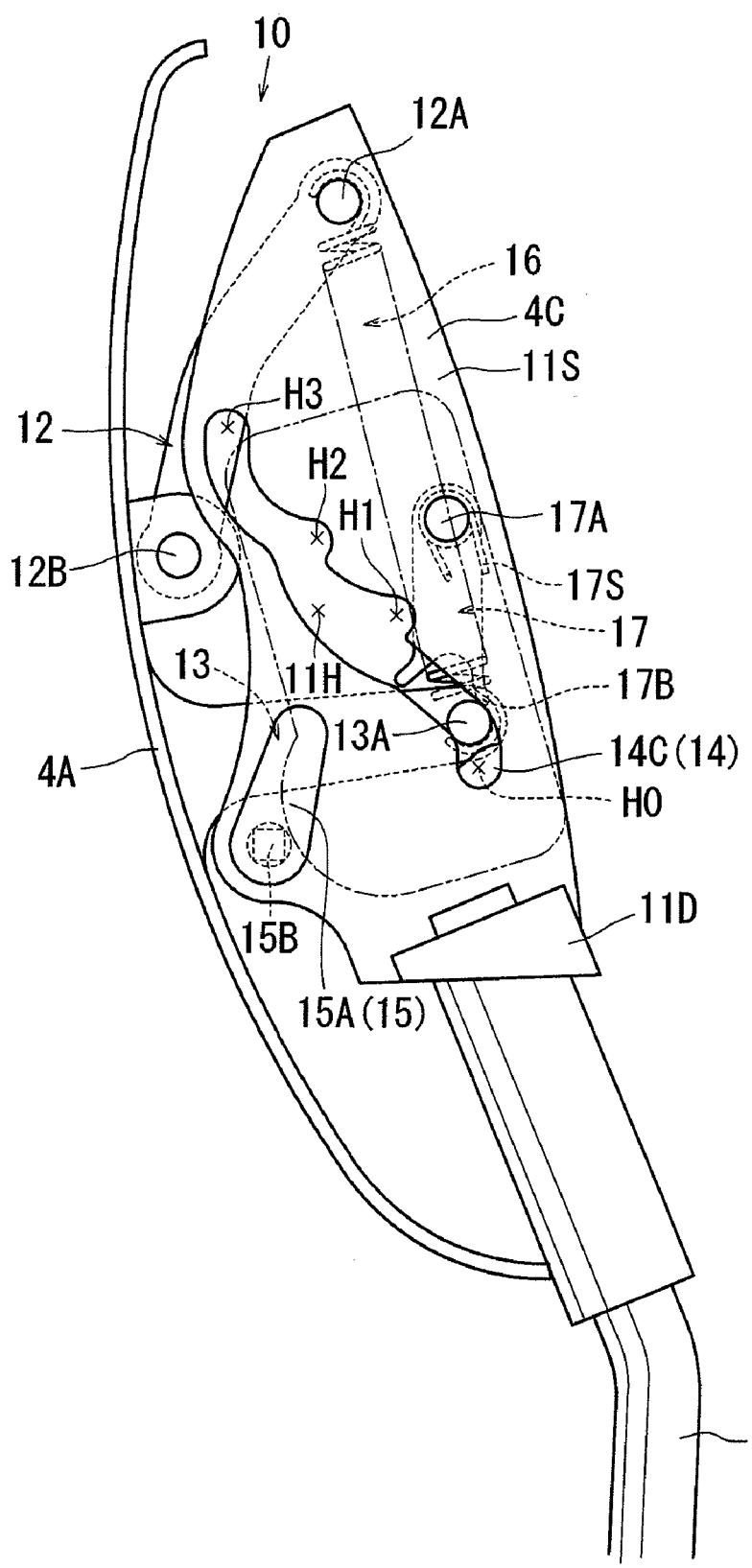
FIG. 10 is a side view of the head rest according to Embodiment 1, which illustrates an intermediate condition in which the support portion of the head rest is further moved from the condition in FIG. 9 toward the initial position.

Further, as shown in FIG. 9, when the connection shaft 13A moves downwardly from the upper end portions H3 within the elongated holes 11H, the receiving portions 17B can catch the connection shaft 13A by spoon-shaped inner portions thereof. In this condition, when the connection shaft 13A further moves downwardly, the lever members 17 are pushed and rotated counterclockwise in the drawing while the connection shaft 13A is caught by the receiving portions 17B. As a result, the connection shaft 13A moves downwardly while guided by the lever members 17. As shown in FIG. 6, when the connection shaft 13A is transferred to a portion closer to the lower end portions H0, the connection shaft 13A is released from the receiving portions 17B. Thus, when the connection shaft 13A moves downwardly from the upper end portions H3 within the elongated holes 11H, the connection shaft 13A is smoothly transferred to the lower end portions H0 by the lever members 17 without entering the first stopper grooves H1 or the second stopper grooves H2.

Further, because the connection shaft 13A is operated so as to be pressed toward the lower end portions H0 of the elongated holes 11H, the connection shaft 13A reaches the lower end portions H0 while pressing down the lower jaw portions 14C of the hooks 14 that are exposed to the lower end portions H0. As a result, as shown in FIG. 6, the hooks 14 are rotated clockwise, so as to be positioned in conditions in which the upper jaw portions 14B thereof are rotated over an upper side of the connection shaft 13A.

When the hooks 14 are rotated clockwise in the drawing, the engagement portions Ct of the engagement arm portions 15C can elastically enter the engagement grooves 14D, so that the engagement arm portions 15C engage the hooks 14 again. As a result, the connection shaft 13A can be retained in the initial position by the hooks 14 again, so that the support portion 4A can be retained in the initial position thereof, i.e., a position before it is moved forwardly.

Next, function of the head rest moving mechanism 10 will be described.

In a normal condition, the support portion 4A of the head rest 4 is retained in the initial position shown in FIG. 2. When the back-side collision of the vehicle happens and then the detection signals transmitted from the position detection sensor 6 and the acceleration sensor 7 are input to the control device of the drive device 20 as the AND operation conditions, the engagement-disengagement member 15 is rotated by the drive device 20, the condition in which the support portion 4A is retained in the initial position can be released. As a result, the support portion 4A moves from the initial position shown in FIG. 5 to the collision adaptable position shown in FIG. 8 by the biasing force of the tension spring 16 shown in FIG. 5. In the collision adaptable position, the support portion 4A can catch the head of the sitting passenger from behind.

The drive device 20 is combined with the reducing mechanism that is constructed of the electric rotary motor 21, the worm 22 and the worm wheel 23. Therefore, even when the drive device 20 is systemized to be actuated after the detection signals from the position detection sensor 6 and the acceleration sensor 7 indicating the back-side collision of the vehicle are detected, the engaging condition of the engagement-disengagement member 15 can be instantaneously released, so that the support portion 4A of the head rest 4 can be moved toward the head. The drive device 20 has no limitations on a rotational movement range thereof. Therefore, if the engagement-disengagement member 15 has a large rotation angle, the drive device 20 can instantaneously rotate the engagement-disengagement member 15 with a relatively large force to a disengaging position thereof. Thus, even if the engagement-disengagement member 15 has the large rotation angle, the engaging condition thereof can be released without increasing the drive device 20 in size, i.e., using the drive device 20 in a relatively small size.

As previously described, the electric signals respectively detected by the position detection sensor 6 and the acceleration sensor 7 are input to the back-side collision judgment ECU 40 via the AND circuit shown in FIG. 11, so that the electric motor 21 of the drive device 20 can be driven based on judgment at the back-side collision judgment ECU 40. Therefore, the drive device 20 can be prevented from being erroneously actuated by some phenomena other than the back-side collision. For example, when the passenger wildly sits on the seat 1 or when the passenger knees the seat back 2, the rod 2R can be pressed, so that the position detection sensor 6 can generate the same detection signal as the signal that is generated at the time of the back-side collision. However, even if the position detection sensor 6 generates such a detection signal, the electric motor 21 can not be driven unless the detection signal is generated by the acceleration sensor 7. Therefore, the support portion 4A of the head rest 4 cannot move to the collision adaptable position shown in FIG. 8 and can be maintained in the initial position shown in FIG. 2. Further, the back-side collision of the vehicle can be judged by the AND operation of the detection signals from the sensors 6 and 7. Therefore, if a threshold value of each of the position detection sensor 6 and the acceleration sensor 7 is reduced to increase responsiveness of the sensors 6 and 7, possibility of a malfunction of the drive device 20 can be prevented.

The position detection sensor 6 can be simply biased with a minimum spring force that is required to maintain the same in an inactive condition. That is, the spring force can be set to a minimum force that is required to restore the position detection sensor 6 from an active condition to the inactive condition. Thus, the position detection sensor 6 is not applied with an excessive biasing force, so the position detection sensor 6 may have increased responsiveness.

The rod 2R positioned in the seat back 2 to apply the rotational force to the position detection sensor 6 simply functions to rotate the position detection sensor 6 depending on the sinking amount of the body of the sitting passenger into the seat back 2. Therefore, in a normal sitting condition, the rod 2R scarcely applies a pressing force to the body. In addition, the rod 2R can also be disposed on a rear surface of a contour mat (not shown) of the back frame 2F. As a result, a sitting comfort of the seat 1 can be suitably maintained.

Next, Embodiments 2 to 4 of the present invention will be described with reference to FIGS. 12 to 14.

Figure 12:
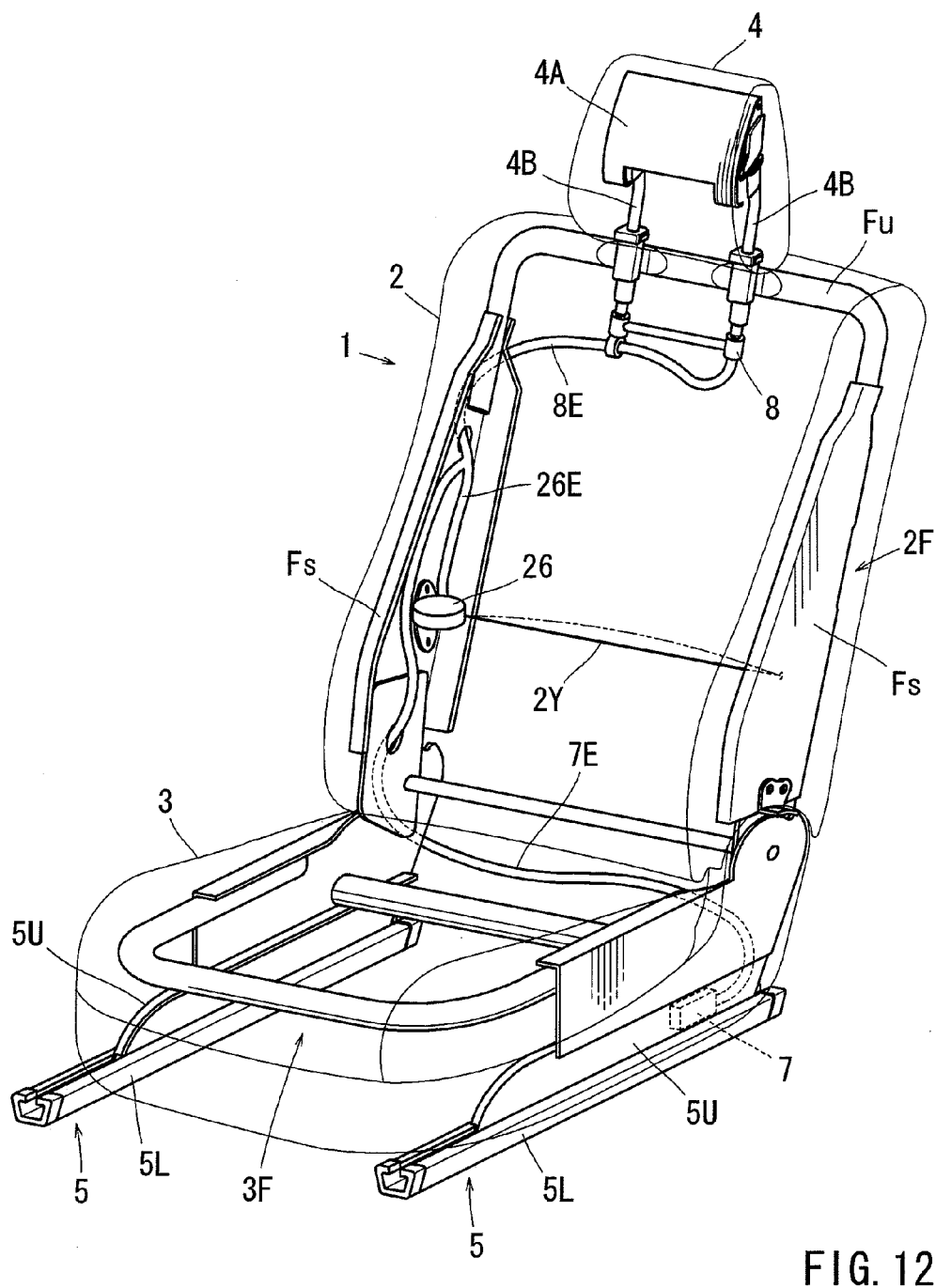
FIG. 12 is a perspective view of an inner structure of a vehicle seat according to Embodiment 2.

In Embodiment 2 shown in FIG. 12, a position detection sensor 26 capable of rotating around a vertical axis is attached to the inner side of one of the side frames Fs of the back frame 2F. The sensor 26 may function as the first sensor for detecting the back-side collision of the vehicle. A wire 2Y extends between the position detection sensor 26 and the inner side of the other of the side frames Fs. When the body of the sitting passenger sinks into the seat back 2 at the time of the back-side collision of the vehicle, the wire 2Y is pulled as indicated by broken lines of FIG. 12. As a result, a portion of the wire 2Y that is previously wound up in the position detection sensor 26 is pulled out, a rotational force around the vertical axis can be applied to the position detection sensor 26. As a result, the back-side collision of the vehicle can be detected from a rotation angle of the position detection sensor 26. In the normal sitting condition, the wire 2Y can further reduce the pressing force applied to the body.

The second sensor for detecting the back-side collision of the vehicle is the acceleration sensor 7 used in Embodiment 1. Similar to Embodiment 1, the second sensor is secured to the upper rail 5U of one of the slide rails 5. Further, similar to Embodiment 1, the back-side collision of the vehicle can be judged by the AND operation of detection signals from these sensors. This will also apply to Embodiment 3 and 4.

Further, an electrical wire 26E for transmitting a signal from the position detection sensor 26 is bundled with the electrical cable 7E for transmitting the signal from the acceleration sensor 7, thereby forming the electrical cable 8E. Similar to Embodiment 1, the electrical cable 8E is connected to the connector 8.

Figure 13:
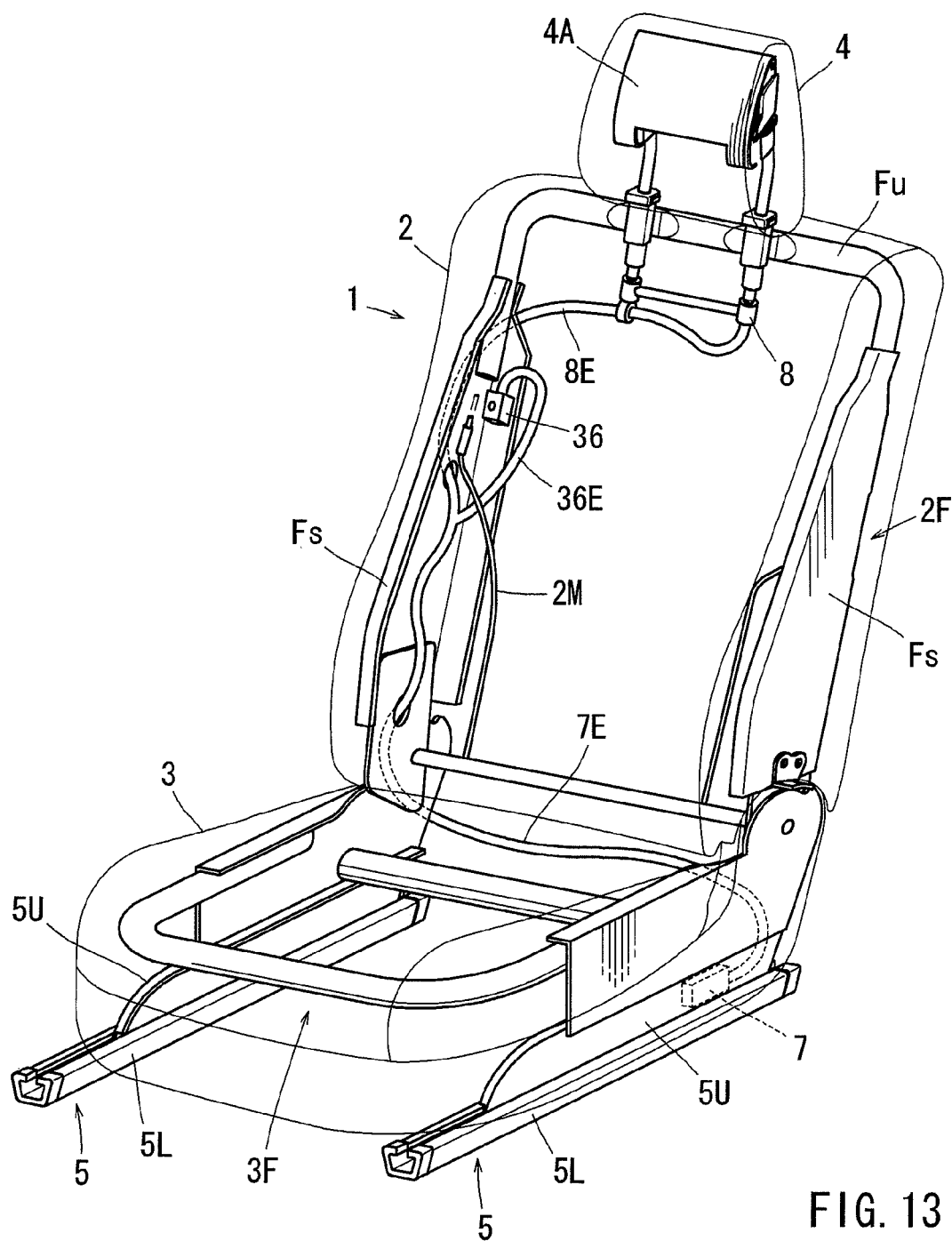
FIG. 13 is a perspective view of an inner structure of a vehicle seat according to Embodiment 3.

In Embodiment 3 shown in FIG. 13, a Hall IC sensor (IC sensor) 36 as the first sensor is attached to the inner side of one of the side frames Fs of the back frame 2F. An upper end portion of a mat spring 2M of the back frame 2F is positioned adjacent to a front surface of the Hall IC sensor 36. A lower end portion of the mat spring 2M is supported by a fish-mouth spring (not shown). The Hall IC sensor 36 is constructed to detect as to whether the upper end portion of the mat spring 2M is positioned at the front surface thereof.

When the body of the sitting passenger sinks into the seat back 2 at the time of the back-side collision of the vehicle, a lower portion of the mat spring 2M moves rearwardly due to deformation of the fish-mouth spring. As a result, as shown by broken lines of FIG. 13, the upper end portion of the mat spring 2M protrudes in front of the front surface of the Hall IC sensor 36, so that the back-side collision of the vehicle can be detected by the Hall IC sensor 36. An electrical wire 36E for transmitting a signal from the Hall IC sensor 36 is bundled with the electrical cable 7E for transmitting the signal from the acceleration sensor 7, thereby forming the electrical cable 8E. Similar to Embodiment 1, the electrical cable 8E is connected to the connector 8.

Figure 14:
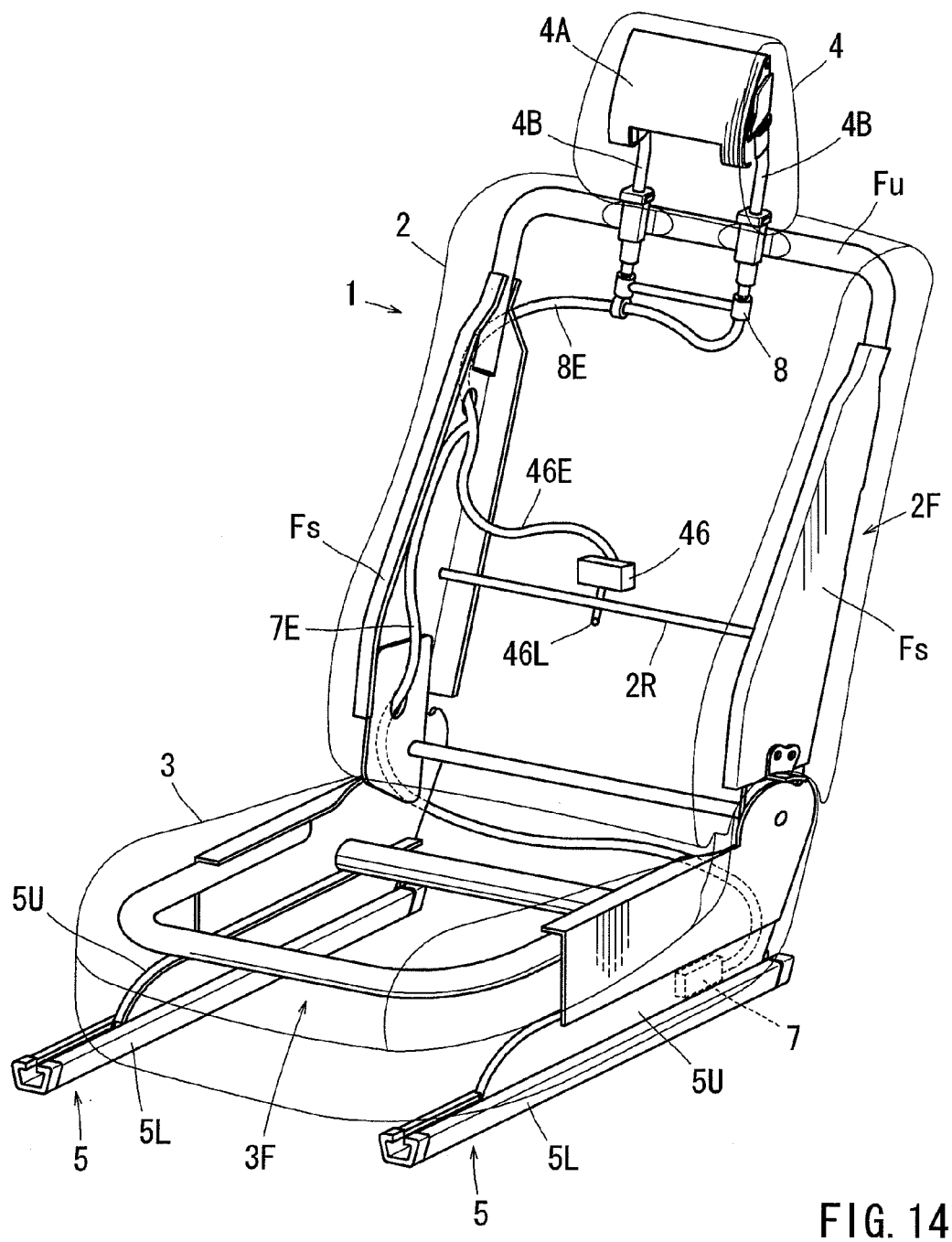
FIG. 14 is a perspective view of an inner structure of a vehicle seat according to Embodiment 4.

In Embodiment 4 shown in FIG. 14, an on-off type switch 46 is used as the first sensor. The switch 46 has a switching lever portion 46L that is connected to a spring member (e.g., a member corresponding to the rod 2R shown in the drawing) of the back frame 2F. Further, a main body of the switch 46 is secured to an appropriate member of the back frame 2F.

When the body of the sitting passenger sinks into the seat back 2 at the time of the back-side collision of the vehicle, the lever portion 46L of the switch 46 is pushed, so that the switch 46 can be switched. Thus, the back-side collision of the vehicle can be detected by the switch 46. An electrical wire 46E for transmitting a signal from the switch 46 is bundled with the electrical cable 7E for transmitting the signal from the acceleration sensor 7, thereby forming the electrical cable 8E. Similar to Embodiment 1, the electrical cable 8E is connected to the connector 8.

A best mode for carrying out the present invention described above with reference to the drawings can be easily modified without departing from the scope of the invention. For example, the head rest moving mechanism 10 can be modified such that the support portion 4A can be moved via an X-link that is operated by the driving force produced by the electric motor.

The invention claimed is:
1. A vehicle seat comprising:
a first sensor that is disposed inside a seat back and is capable of detecting a back-side collision of a vehicle when pressed by a body of a sitting passenger; and a second sensor that is capable of detecting the back-side collision of the vehicle based on a longitudinal acceleration of the vehicle, wherein the first sensor and the second sensor are respectively oppositely disposed in a widthwise direction of the vehicle seat, wherein a head rest is constructed to be moved forwardly based on detection signals when both of the first and second sensors detect the back-side collision of the vehicle, wherein the first sensor disposed inside the seat back comprises a position detection sensor that is actuated when pressed by the body of the sitting passenger, and wherein a biasing force for maintaining the first sensor in an inactive condition is set to a force that is required to restore the first sensor from an active condition to the inactive condition, wherein the position detection sensor comprises a rotation angle detection sensor that is attached to one of right and left sides of a back frame of the seat back, wherein one end of a rod is connected to the position detection sensor, wherein an other end of the rod is connected to the other of the right and left sides of the back frame, and wherein when the rod is pressed by the body of the sitting passenger at the time of the back-side collision of the vehicle, a rotational force can be applied to the rotation angle detection sensor, so that the back-side collision of the vehicle can be detected.

2. A vehicle seat comprising:

a first sensor that is disposed inside a seat back and is capable of detecting a back-side collision of a vehicle when pressed by a body of a sitting passenger; and a second sensor that is capable of detecting the back-side collision of the vehicle based on a longitudinal acceleration of the vehicle, wherein the first sensor and the second sensor are respectively oppositely disposed in a widthwise direction of the vehicle seat, wherein a head rest is constructed to be moved forwardly based on detection signals when both of the first and second sensors detect the back-side collision of the vehicle, wherein the first sensor disposed inside the seat back comprises a position detection sensor that is actuated when pressed by the body of the sitting passenger, and wherein a biasing force for maintaining the first sensor in an inactive condition is set to a force that is required to restore the first sensor from an active condition to the inactive condition, wherein the position detection sensor comprises a rotation angle detection sensor that is attached to one of right and left sides of a back frame of the seat back, wherein the position detection sensor has a wire that is wound up therein, wherein one end of the wire is connected to the other of the right and left sides of the back frame, and wherein when the wire is pulled by the body of the sitting passenger at the time of the back-side collision of the vehicle, a portion of the wire that is previously wound up in the position detection sensor is pulled out, so that a rotational force can be applied to the rotation angle detection sensor and as a result, the back-side collision of the vehicle can be detected.

3. The vehicle seat as defined in claim 2, wherein the seat is supported by a slide rail such that a longitudinal position thereof can be adjusted, and wherein the second sensor comprises an acceleration sensor that is disposed on the slide rail.

4. The vehicle seat as defined in claim 3, wherein the acceleration sensor is disposed on an upper rail of the slide rail.

5. The vehicle seat as defined in claim 3, wherein a pair of slide rails are disposed on right and left sides of the vehicle seat, and wherein the acceleration sensor is disposed on the slide rail that is positioned adjacent to a central portion of the vehicle.

6. The vehicle seat as defined in claim 2, wherein a head rest moving mechanism for moving the head rest has a biasing force that is capable of moving the head rest forwardly, and wherein the head rest moving mechanism is locked and is capable of being unlocked based on the detection signals when both of the first sensor and the second sensor detect the back-side collision of the vehicle.

7. The vehicle seat as defined in claim 6, wherein the head rest moving mechanism comprises a connection link movably supporting the head rest, and an elongated hole capable of guiding a connection shaft integrally provided to the head rest in order to control a posture of the head rest in cooperation with the connection link when the head rest is moved, and wherein the elongated hole is shaped such that the connection shaft at the time the head rest is moved forwardly can be guided from a normal position to a collision adaptable position at the time the back-side collision of the vehicle is detected.

8. A vehicle seat comprising:

a first sensor that is disposed inside a seat back and is capable of detecting a back-side collision of a vehicle when pressed by a body of a sitting passenger; and a second sensor that is capable of detecting the back-side collision of the vehicle based on a longitudinal acceleration of the vehicle, wherein the first sensor and the second sensor are respectively oppositely disposed in a widthwise direction of the vehicle seat, wherein a head rest is constructed to be moved forwardly based on detection signals when both of the first and second sensors detect the back-side collision of the vehicle, wherein the first sensor disposed inside the seat back comprises a position detection sensor that is actuated when pressed by the body of the sitting passenger, and wherein a biasing force for maintaining the first sensor in an inactive condition is set to a force that is required to restore the first sensor from an active condition to the inactive condition, wherein the position detection sensor comprises a Hall IC sensor that is attached to a back frame of the seat back, wherein an end portion of a mat spring of the back frame is positioned adjacent to a front surface of the Hall IC sensor, and wherein the end portion of the mat spring protrudes in front of the front surface of the Hall IC sensor in conjunction with movement of the body of the sitting passenger at the time of the back-side collision of the vehicle, so that the back-side collision of the vehicle can be detected by the Hall IC sensor.

9. The vehicle seat as defined in claim 8, wherein the seat is supported by a slide rail such that a longitudinal position thereof can be adjusted, and wherein the second sensor comprises an acceleration sensor that is disposed on the slide rail.

10. The vehicle seat as defined in claim 9, wherein the acceleration sensor is disposed on an upper rail of the slide rail.

11. The vehicle seat as defined in claim 9, wherein a pair of slide rails are disposed on right and left sides of the vehicle seat, and
wherein the acceleration sensor is disposed on the slide rail that is positioned adjacent to a central portion of the vehicle.

12. The vehicle seat as defined in claim 8, wherein a head rest moving mechanism for moving the head rest has a biasing force that is capable of moving the head rest forwardly, and
wherein the head rest moving mechanism is locked and is capable of being unlocked based on the detection signals when both of the first sensor and the second sensor detect the back-side collision of the vehicle.

13. The vehicle seat as defined in claim 12, wherein the head rest moving mechanism comprises a connection link movably supporting the head rest, and an elongated hole capable of guiding a connection shaft integrally provided to the head rest in order to control a posture of the head rest in cooperation with the connection link when the head rest is moved, and
wherein the elongated hole is shaped such that the connection shaft at the time the head rest is moved forwardly can be guided from a normal position to a collision adaptable position at the time the back-side collision of the vehicle is detected.

14. A vehicle seat comprising:
a first sensor that is disposed inside a seat back and is capable of detecting a back-side collision of a vehicle when pressed by a body of a sitting passenger; and
a second sensor that is capable of detecting the back-side collision of the vehicle based on a longitudinal acceleration of the vehicle,
wherein the first sensor and the second sensor are respectively oppositely disposed in a widthwise direction of the vehicle seat,
wherein a head rest is constructed to be moved forwardly based on detection signals when both of the first and second sensors detect the back-side collision of the vehicle,
wherein the first sensor disposed inside the seat back comprises a position detection sensor that is actuated when pressed by the body of the sitting passenger, and
wherein a biasing force for maintaining the first sensor in an inactive condition is set to a force that is required to restore the first sensor from an active condition to the inactive condition,
wherein the position detection sensor comprises an on-off type switch that is attached to a back frame of the seat back,
wherein a switching lever portion of the on-off type switch is connected to a spring member of the back frame, and
wherein the switching lever portion of the on-off type switch is switched by the spring member that is capable of moving in conjunction with movement of the body of the sitting passenger at the time of the back-side collision of the vehicle, so that the back-side collision of the vehicle can be detected by the on-off type switch.

15. The vehicle seat as defined in claim 14, wherein the seat is supported by a slide rail such that a longitudinal position thereof can be adjusted, and
wherein the second sensor comprises an acceleration sensor that is disposed on the slide rail.

16. The vehicle seat as defined in claim 15, wherein the acceleration sensor is disposed on an upper rail of the slide rail.

17. The vehicle seat as defined in claim 15, wherein a pair of slide rails are disposed on right and left sides of the vehicle seat, and
wherein the acceleration sensor is disposed on the slide rail that is positioned adjacent to a central portion of the vehicle.

18. The vehicle seat as defined in claim 14, wherein a head rest moving mechanism for moving the head rest has a biasing force that is capable of moving the head rest forwardly, and
wherein the head rest moving mechanism is locked and is capable of being unlocked based on the detection signals when both of the first sensor and the second sensor detect the back-side collision of the vehicle.

19. The vehicle seat as defined in claim 18, wherein the head rest moving mechanism comprises a connection link movably supporting the head rest, and an elongated hole capable of guiding a connection shaft integrally provided to the head rest in order to control a posture of the head rest in cooperation with the connection link when the head rest is moved, and
wherein the elongated hole is shaped such that the connection shaft at the time the head rest is moved forwardly can be guided from a normal position to a collision adaptable position at the time the back-side collision of the vehicle is detected.

20. The vehicle seat as defined in claim 1, wherein the seat is supported by a slide rail such that a longitudinal position thereof can be adjusted, and
wherein the second sensor comprises an acceleration sensor that is disposed on the slide rail.

21. The vehicle seat as defined in claim 20, wherein the acceleration sensor is disposed on an upper rail of the slide rail.

22. The vehicle seat as defined in claim 20, wherein a pair of slide rails are disposed on right and left sides of the vehicle seat, and
wherein the acceleration sensor is disposed on the slide rail that is positioned adjacent to a central portion of the vehicle.

23. The vehicle seat as defined in claim 1, wherein a head rest moving mechanism for moving the head rest has a biasing force that is capable of moving the head rest forwardly, and
wherein the head rest moving mechanism is locked and is capable of being unlocked based on the detection signals when both of the first sensor and the second sensor detect the back-side collision of the vehicle.

24. The vehicle seat as defined in claim 23, wherein the head rest moving mechanism comprises a connection link movably supporting the head rest, and an elongated hole capable of guiding a connection shaft integrally provided to the head rest in order to control a posture of the head rest in cooperation with the connection link when the head rest is moved, and
wherein the elongated hole is shaped such that the connection shaft at the time the head rest is moved forwardly can be guided from a normal position to a collision adaptable position at the time the back-side collision of the vehicle is detected.

* * * * *

UNITED STATES PATENT AND TRADEMARK OFFICE
CERTIFICATE OF CORRECTION

PATENT NO. : 8,141,945 B2
APPLICATION NO. : 12/596286
DATED : March 27, 2012
INVENTOR(S) : F. Akaike et al.

It is certified that error appears in the above-identified patent and that said Letters Patent is hereby corrected as shown below:

On Title page (86), 371 (C)(1), (2), (4) Date, please change "February 4, 2010" to --January 19, 2010--.

Signed and Sealed this
Twenty-seventh Day of November, 2012

David J. Kappos
*Director of the United States Patent and Trademark Office*